United States Patent [19]
Heitkamp et al.

[11] Patent Number: 5,422,880
[45] Date of Patent: Jun. 6, 1995

[54] BROADBAND SWITCHING FABRIC IN A COMMUNICATION CONTROLLER

[75] Inventors: Ross S. Heitkamp, Mountain View; Charles M. Corbalis, Saratoga; William N. Bedell, Cupertino; Frederick R. Enns, Menlo Park; Amar S. Gupta, Cupertino; John D. Weisbloom, Campbell, all of Calif.

[73] Assignee: Stratacom, Inc., San Jose, Calif.

[21] Appl. No.: 42,826

[22] Filed: Apr. 5, 1993

[51] Int. Cl.$^6$ .......................... H04J 3/06; H04J 3/14; H04L 12/56
[52] U.S. Cl. ................................. 370/60; 370/85.2; 370/85.8; 370/85.11; 370/94.1; 370/95.2; 370/105.4; 375/368; 375/372; 340/825.08
[58] Field of Search .......... 370/13, 14, 16, 54, 370/58.1, 58.2, 58.3, 60, 60.1, 67, 85.1, 85.2, 85.6, 85.7, 85.8, 85.9, 85.11, 94.1, 95.1, 95.2, 105.1–105.4, 106; 340/825.01, 825.03, 826, 827, 825.06, 825.08, 825.54; 371/8.1, 8.2, 11.1, 11.2, 27, 47.1; 375/114, 116, 118, 119, 120; 379/269, 279

[56] References Cited

U.S. PATENT DOCUMENTS

| | | | |
|---|---|---|---|
| 4,340,961 | 7/1982 | Capel et al. | 370/85.8 |
| 4,608,700 | 8/1986 | Kirtley, Jr. et al. | 370/85.8 |
| 4,648,090 | 3/1987 | Maddern et al. | 370/105.3 |
| 4,656,627 | 4/1987 | Hasley et al. | 370/85.2 |
| 4,667,193 | 5/1987 | Cotie et al. | 340/825.08 |
| 4,686,669 | 8/1987 | Chang | 370/54 |
| 4,803,681 | 2/1989 | Takahashi | 370/85.2 |
| 4,924,461 | 5/1990 | Amemiya et al. | 370/85.8 |
| 5,010,329 | 4/1991 | Nagakura | 340/825.08 |
| 5,189,666 | 2/1993 | Kagawa | 370/60 |
| 5,307,465 | 4/1994 | Iki | 379/269 |

FOREIGN PATENT DOCUMENTS
87/02207 4/1987 WIPO .

OTHER PUBLICATIONS
NEC Research & Development, No. 87, 1987, Tokyo, pp. 51–62, Entitled: Development of High-Speed Packet Switching System.

Primary Examiner—Alpus Hsu
Attorney, Agent, or Firm—Blakely, Sokoloff, Taylor & Zafman

[57] ABSTRACT

A method and apparatus for exchanging communication cells in a communication controller, wherein an arbiter determines transmission requests for each of a plurality of communication modules in the communication controller. Each communication module has a transmit signal line and a receive signal line coupled to a switching circuit in the communication controller. The arbiter selectively couples the transmit signal lines to the receive signal lines according to the transmission requests. The communication modules transmit communication cells through the switching circuit, while the arbiter determines new transmission requests from each communication module.

37 Claims, 17 Drawing Sheets

| FRAME N | FRAME N+1 | FRAME N+2 | FRAME N+3 | FRAME N+4 | FRAME N+5 | FRAME N+6 |
|---|---|---|---|---|---|---|
| SINGLE DEST. REQUEST #2; | SINGLE DEST. REQUEST #3; | NULL REQUEST; | SINGLE DEST. REQUEST #4 | SINGLE DEST. REQUEST #4; | SINGLE DEST. REQUEST #4; | NULL REQUEST; |
| GRANTED | GRANTED | NO GRANT | NO GRANT | NO GRANT | GRANTED | NO GRANT |
| TRANSMIT FRAME IDLE | TRANSMIT CELL TO M2 | TRANSMIT CELL TO M3 | TRANSMIT FRAME IDLE | TRANSMIT FRAME IDLE | TRANSMIT FRAME IDLE | TRANSMIT CELL TO M4 |

*Figure 6*

| FRAME M | FRAME M+1 | FRAME M+2 | FRAME M+3 | FRAME M+4 | FRAME M+5 | FRAME M+6 |
|---|---|---|---|---|---|---|
| NULL REQUEST; | MULTI-CAST REQUEST; | NULL REQUEST; | NULL REQUEST; | SINGLE-DEST. REQUEST; | NULL REQUEST; | NULL REQUEST; |
| NO GRANT | GRANTED | NO GRANT | NO GRANT | GRANTED | NO GRANT | NO GRANT |
| TRANSMIT FRAME IDLE | TRANSMIT FRAME IDLE | TRANSMIT FRAME IDLE | TRANSMIT FRAME IDLE | TRANSMIT MULTI-CAST | TRANSMIT CELL | TRANSMIT FRAME IDLE |

← MULTI-CASE POLL CYCLE ENABLED

*Figure 7*

BROADBAND SWITCHING FABRIC IN A COMMUNICATION CONTROLLER

FIELD OF THE INVENTION

The present invention pertains to the field of digital communication controllers. More particularly, this invention relates to a broadband switching fabric in a high speed communication controller.

BACKGROUND OF THE INVENTION

Packet switching networks are commonly employed to transfer digital information over long distances. More recent packet switching networks are also known as cell relay networks. A typical cell relay network is comprised of a set of cell switching communication controllers coupled together for communication over long distance communication links. A cell relay network enables a variety of communication devices coupled to local communication links to share the common carrier communication links. A cell relay network enables the communication devices to transfer digital information over the common carrier communication links on a demand driven basis. The demand driven sharing of the common carrier communication links reduces the cost of maintaining a long distance communication network.

The capacity of a cell network is usually limited by the bandwidth and connectivity of the cell switching communication controllers. For example, the topology of a typical cell network requires the communication controllers to perform high speed tandem switching. Tandem switching occurs when a communication controller receives a communication cell over one communication link, and transmits the communication cell over another communication link to route the communication cell to the proper destination. The communication controllers must allocate sufficient bandwidth to perform tandem switching for new communication devices added to the cell network.

Each communication controller typically supports only a limited number of communication links. Moreover, the capability of a communication controller to perform tandem switching is limited by the bandwidth of the cell switching mechanism inside the communication controller. The bandwidth limitation of the communication controllers limits the capacity of the cell network because the addition of new communication devices to the cell network exhausts available bandwidth.

A typical prior communication controller is comprised of a set of communication modules for transmitting and receiving high speed digital information over a communication link. During tandem switching, one communication module receives a communication cell over a communication link, and transfers the communication cell to another communication module which transmits the communication cell over another communication link.

In some prior communication controllers, communication cells are transferred between the communication modules over a shared communication bus. Such shared communication buses suffer from limited bandwidth because of the physical characteristics of the bus signal lines. For example, the capacitive characteristics of the bus signal lines creates a minimum charging and settling time for the bus signals, thereby limiting bus bandwidth.

In addition, a shared communication bus usually achieves maximum bandwidth at an optimal bus impedance value. Each communication module coupled to the communication bus contributes to overall bus impedance. Unfortunately, the overall impedance of the communication bus moves away from the optimal bus impedance value when communication modules are installed or removed from the communication controller.

Moreover, the switching skew between the various transmitting agents on a shared communication bus can cause signal overlap and current spikes on the bus. The current spikes cause bus noise and increase system power consumption.

One method of increasing the bandwidth of a shared bus is to increase the bus width by increasing the number of bus signal lines. A widened shared bus requires increased data buffer circuitry on each communication module coupled to the bus. Unfortunately, the increased data buffer circuitry increases the cost and power consumption of the communication modules and of the overall communication controller.

A communication controller may employ a Batcher-Banyan or Benes Network as a switch fabric to enable high bandwidth transfer of communication cells between the communication modules. However, such fabrics typically require custom very large scale integrated circuit (VLSI) chip implementations, which increase system cost. Moreover, a lack of internal control of such networks increases the difficulty of predicting and controlling congestion in the switch circuitry.

A communication controller may employ a collection of switched serial communication lines to transfer communication cells between communication modules. Such a communication controller must independently synchronize the serial data transmission over each of the switched serial communication lines.

One prior method of synchronizing the serial data transmissions is to distribute a separate clock signal for each serial data signal. Unfortunately, such a method doubles the number of signal lines that must be switched, and greatly increases the cost and complexity of a switching circuit.

Another prior method of synchronizing the serial data transmissions is to embed a clock signal into the serial data signals. A disadvantage of such a method is that the switching circuit must have twice the bandwidth than would be required if the clock signal were not embedded into the serial data signals.

Another prior method of synchronizing the serial data signals is to employ a phase-locked loop circuit (PLL). A typical PLL circuit requires hundreds of nanoseconds to achieve synchronization. Unfortunately, the continuous switching of the serial communication lines renders PLL circuits unsuitable for use with high bandwidth switched serial lines.

SUMMARY AND OBJECTS OF THE INVENTION

One object of the present invention is to provide a broadband switching fabric in a communication controller.

Another object of the present invention is to exchange communication cells in a broadband cell exchange unit by selectively coupling high speed serial data transfer links through a broadband switching circuit.

A further object of the present invention is to selectively couple high speed serial data transfer links through a broadband switching circuit while enabling high speed synchronization of data transmissions.

Another object of the present invention is to enable a communication controller to perform broadband tandem switching.

Another object of the present invention is to improve the capacity and performance of an existing cell switching communication network by providing broadband cell exchange units for performing tandem switching.

These and other objects of the invention are provided by a method and apparatus for exchanging communication cells in a communication controller. An arbiter determines a first transmission request for each of a plurality of communication modules in the communication controller. Each communication module has a transmit signal line and a receive signal line coupled to a switching circuit in the communication controller. The arbiter selectively couples the transmit signal lines to the receive signal lines according to the first transmission requests.

Thereafter, the communication modules transmit communication cells corresponding to the first transmission requests over the transmit signal lines, and receive the communication cells corresponding to the first transmission requests over the receive signal lines, while the arbiter determines a second transmission request for each communication module. The arbiter then selectively couples the transmit signal lines to the receive signal lines according to the second transmission requests.

Thereafter, the communication modules transmit communication cells corresponding to the second transmission requests over the transmit signal lines, and receive the communication cells corresponding to the second transmission requests over the receive signal lines, while the arbiter determines a third transmission request for each communication module.

The arbiter determines transmission requests by transmitting a poll to each communication module over a poll bus and receiving the transmission requests over a request bus, wherein the transmission requests specify either destination communication modules or a null request.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which:

FIG. 6 illustrates a series of single-destination transmission requests over the arbitration/control bus, and corresponding cell frame transfers, wherein the transmission requests and cell frame transfers occur within a series of FRAMEs (FRAME N - FRAME N+6);

FIG. 7 illustrates a series of single-destination and multi-cast transmission requests over the arbitration/control bus, and corresponding cell frame transfers, wherein the transmission requests and cell frame transfers occur within a series of FRAMEs (FRAME M - FRAME M+6);

DETAILED DESCRIPTION

Figure 1:
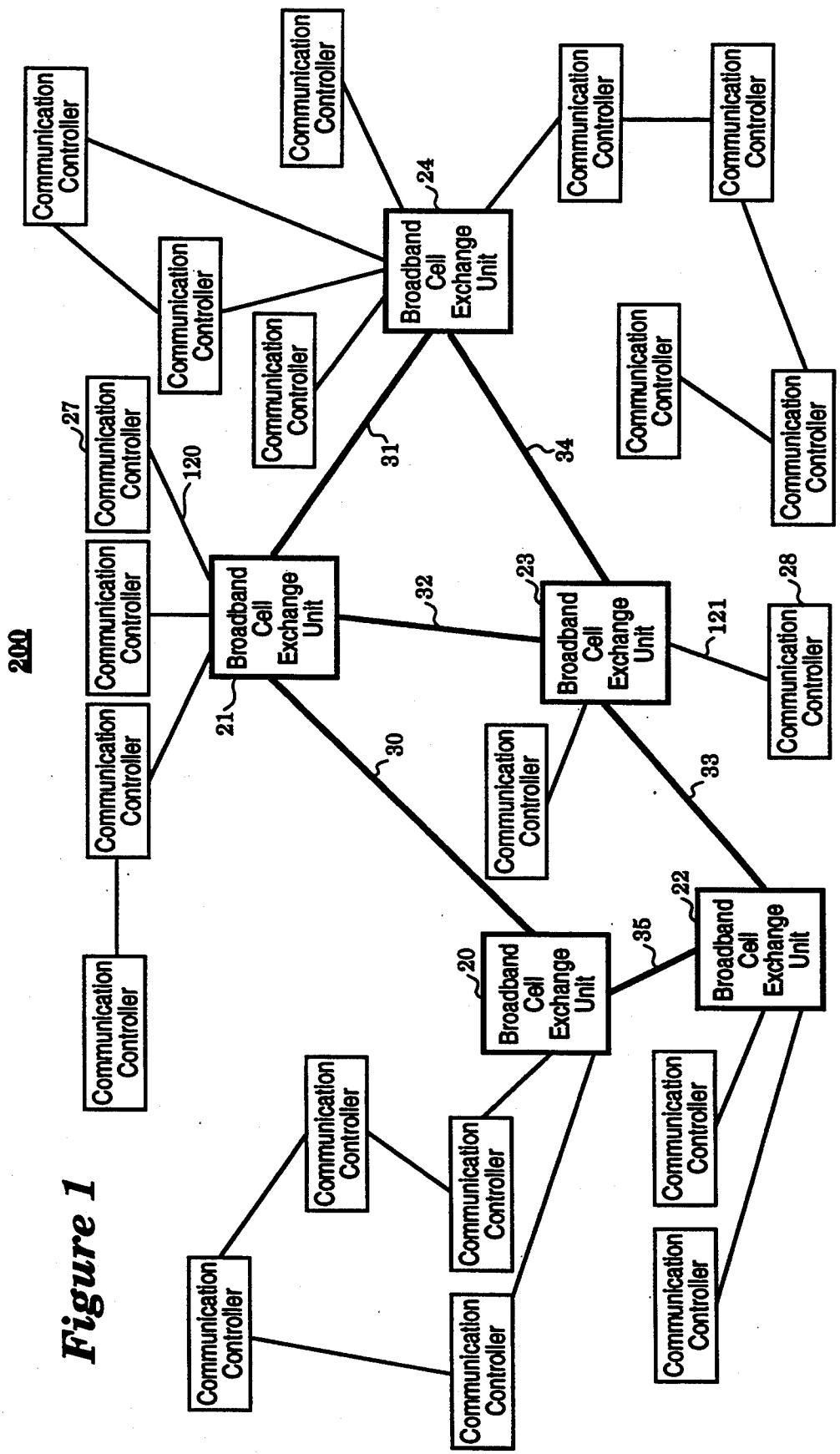
FIG. 1 illustrates one communication network comprising of a set of cell switching communication controllers (CC) and a set of broadband cell exchange units (BCX)

FIG. 1 illustrates one communication network 200. The communication network 200 is comprised of a set of cell switching communication controllers (CC) and a set of broadband cell exchange units (BCX) 20–24.

The cell switching communication controllers CC enable communication over high speed digital communication links according to a cell switching communication protocol. For example, a cell switching communication controller 27 enables communication over a communication link 120, and a cell switching communication controller 28 enables communication over a communication link 121.

The cell switching communication controllers CC enable long distance communication over the communication network 200 among a wide variety of communication devices. For example, communication devices such as private branch exchanges (PBXs), video communication controllers, and local area networks communicate through the cell switching communication controllers CC.

The broadband cell exchange units 20–24 enable communication over a set of broadband communication links 30–35 according to a cell switching communication protocol. For example, the BCX 21 enables communication over the broadband communication links 30–32, and the BCX 23 enables communication over the broadband communication links 32–34.

The BCX 21 also enables communication over communication links to the cell switching communication controllers CC. For example, the BCX 21 enables communication with the CC 27 over the communication link 120, and the BCX 23 enables communication with the CC 28 over the communication link 121.

For one embodiment, the BCXs 20–24 perform tandem switching for the communication network 200. For example, a communication device coupled to the CC 27 communicates with a communication device coupled to the CC 28 by transferring communication cells through the CC 27, the BCX 21, the BCX 23, and the CC 28. For communication between the CC 27 and the CC 28, the BCX 21 switches communication cells between the communication link 120 and the broadband communication link 32, while the BCX 23 switches communication cells between the broadband communication link 32 and the communication link 121.

The BCXs 20–24 increase the capacity of the communication network 200 by performing broadband tandem switching of the communication cells. For one embodiment, each BCX 20–24 enables high speed communication over thirty six separate broadband communication links. The BCXs 20–24 are each substantially similar.

For another embodiment, the BCXs 20–24 enable long distance communication over the communication network 200 among a wide variety of broadband communication devices.

Figure 2:
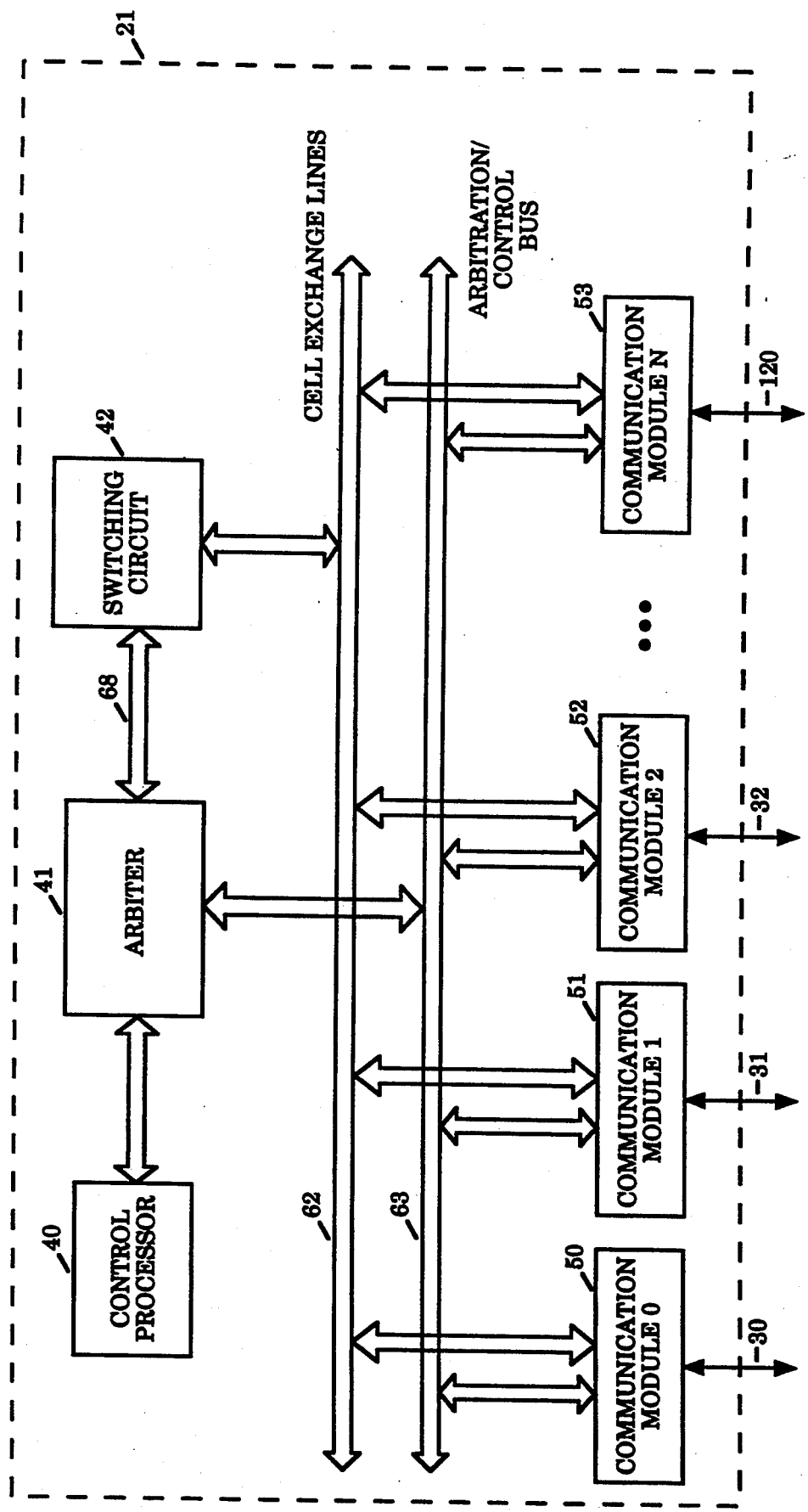
FIG. 2 a block diagram of a broadband cell exchange unit comprising a set of communication modules, along with a control processor, an arbiter, and a switching circuit.

FIG. 2 is a block diagram of the BCX 21. The BCX 21 is comprised of a set of communication modules 50–53, along with a control processor 40, an arbiter 41, and a switching circuit 42.

The communication modules 50–53 enable high speed communication over a variety of communication links according to a cell switching communication protocol. For example, the communication modules 50–52 enable communication over the broadband communication links 30–32, respectively. The communication module 53 enables communication over the communication link 120. Any one of the communication modules 50–52 may enable communication over a plurality of broadband communication links.

The communication modules 50–53 exchange communication cells over a set of cell exchange lines 62. The exchange lines 62 comprise multiple pairs of transmit and receive data lines. The cell exchange lines 62 provide a pair of transmit and receive data lines for each of the communication modules 50–53. The cell exchange lines 62 enable concurrent transmission of multiple serial data streams among the communication modules 50–53.

The switching circuit 42 selectively couples the cell exchange lines 62 to provide full serial communication connectivity among the communication modules 50–53.

The arbiter 41 controls the configuration of the switching circuit 42. The arbiter 41 polls the communication modules 50–53 over an arbitration/control bus 63 to determine transmission requests. The arbiter 41 configures the switching circuit 42 for single-destination transmissions and multi-cast transmissions.

A configuration of the switching circuit 42 for a single-destination transmission provides a serial data transfer link between one source communication module and one destination communication module. A configuration of the switching circuit 42 for a multi-cast transmission provides multiple serial data transfer links from one source communication module to multiple destination communication modules.

The BCX 21 performs tandem switching by exchanging communication cells over the cell exchange lines 62. An inbound communication cell is received from the network 200 by a source communication module, then transferred through a serial data transfer link in the cell exchange lines 62 to a destination communication module, then transferred to the network 200 as an outbound communication module.

For example, the BCX 21 performs tandem switching between the broadband communication links 30 and 31 by exchanging communication cells between the communication modules 50 and 51 over the cell exchange lines 62. The communication module 50 receives an inbound communication cell over the broadband communication link 30. Thereafter, the communication module 50 generates a transmission request in response to a poll by the arbiter 41. The transmission request specifies the communication module 51 as the destination.

The arbiter 41 then configures the switching circuit 42 to create the serial data transfer link for the transmission request between the communication modules 50 and 51. Thereafter, the communication module 50 transmits the communication cell over the configured serial data transfer link on the cell exchange lines 62 to the communication module 51. The communication module 51 receives the communication cell over the configured serial data transfer link, and transmits the communication cell over the broadband communication link 31 as an outbound communication cell.

Similarly, the communication module 51 receives an inbound communication cell over the broadband communication link 31. In response to a poll by the arbiter 41, the communication module 51 generates a transmission request specifying the communication module 50 as the destination. The arbiter 41 then configures the switching circuit 42 to create the requested serial data transfer link, and the communication module 51 transmits the communication cell through the switching circuit 42 to the communication module 50 over the cell exchange lines 62. The communication module 50 receives the communication cell, and transmits the communication cell over the broadband communication link 30 as an outbound communication cell.

The arbiter 41 polls the communication modules 50–53 according to a sequence determined by the control processor 40. The control processor 40 determines the poll sequence ordering and priority to ensure that each of the communication modules 50–53 have sufficient access to serial data transfer links through the switching circuit 42.

Figure 3:
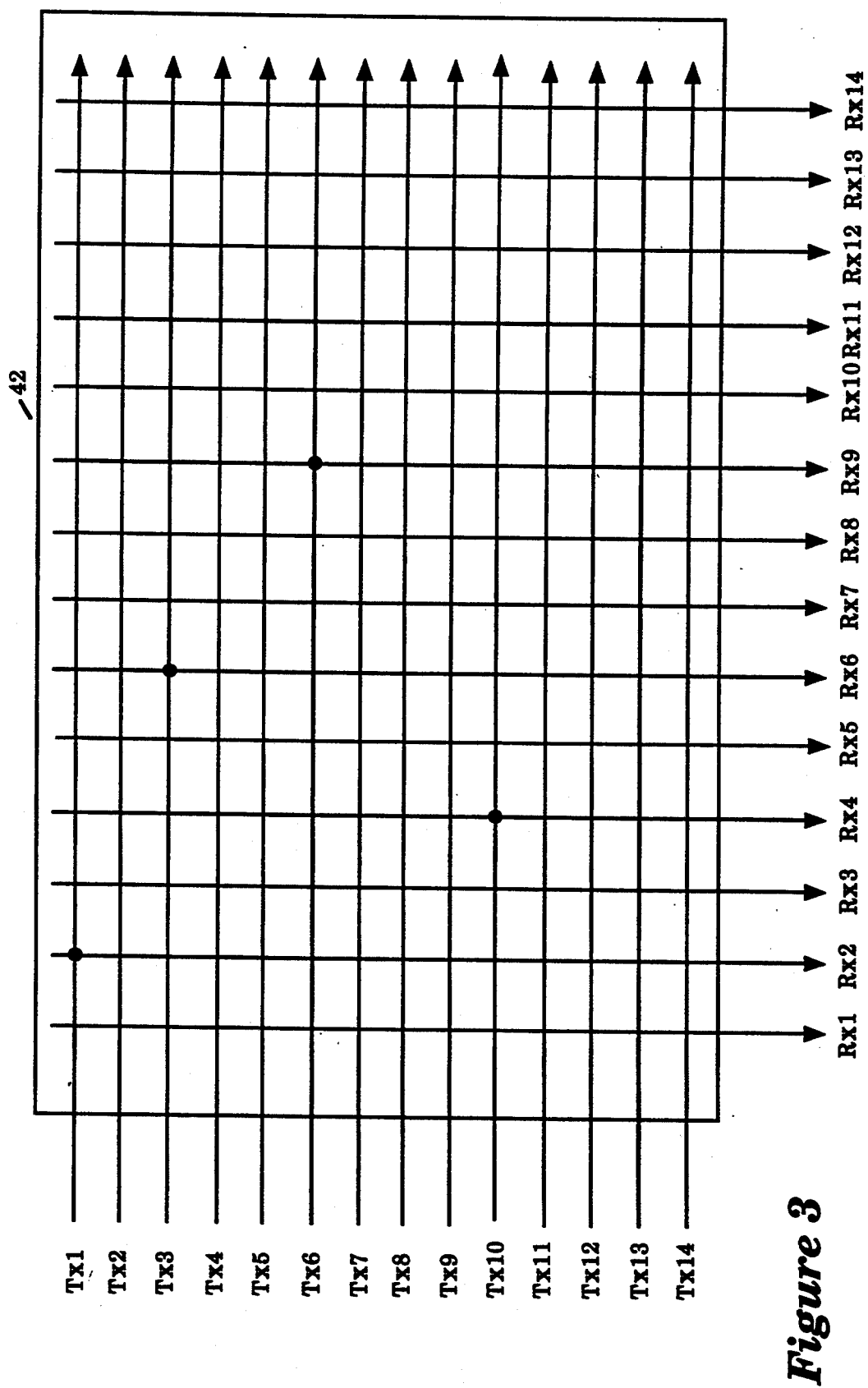
FIGS. 3–4 illustrate example configurations of the switching circuit, wherein the communication modules comprise a set of 14 communication modules (communication modules 1–14)
Figure 4:
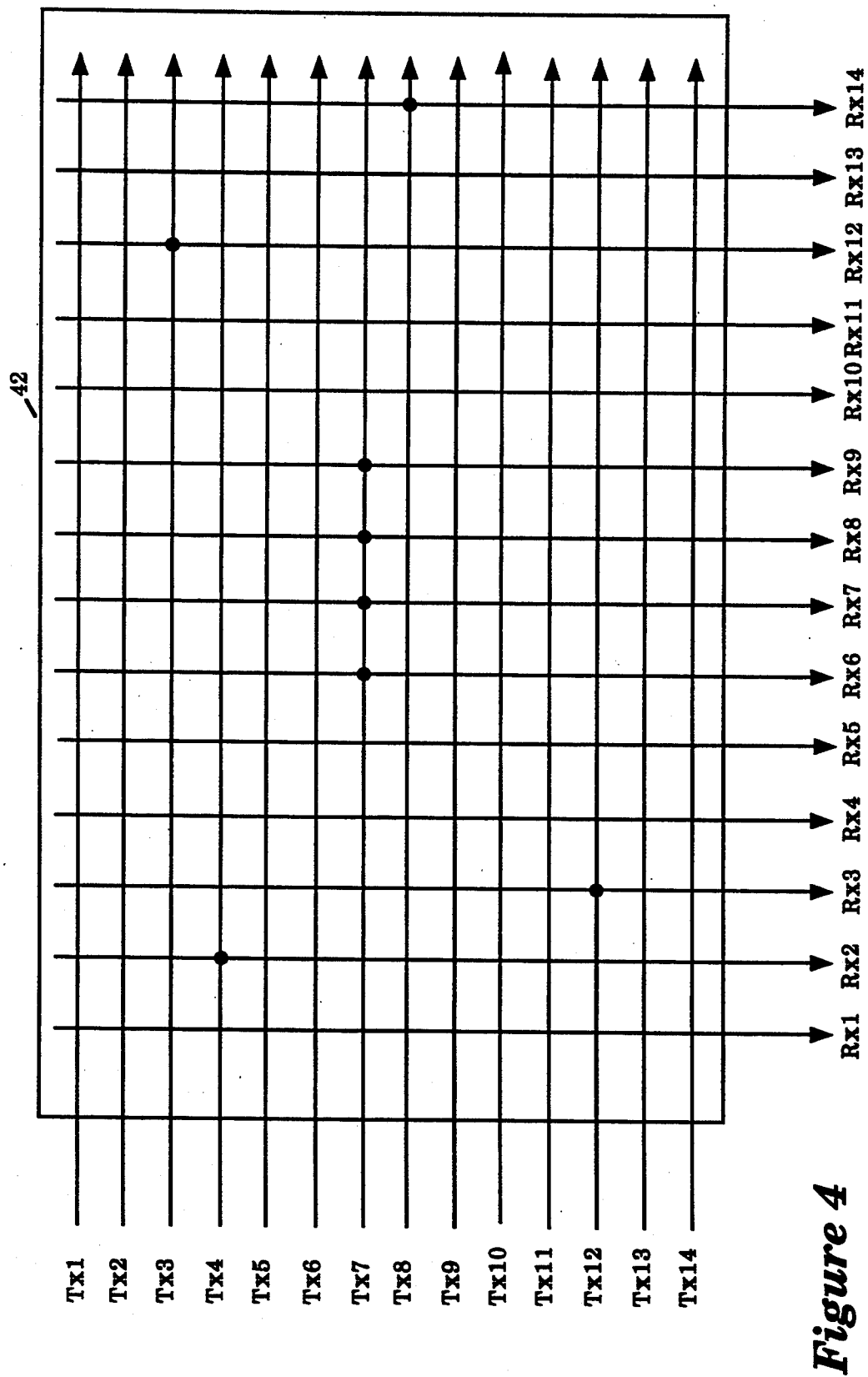

FIGS. 3–4 illustrate example configurations of the switching circuit 42. In the examples shown, the communication modules 50–53 are members of a set of 14 communication modules (communication modules 1–14). Tx1 through Tx14 represent the transmit data lines from the communication modules 1–14 to the switching circuit 42. Rx1 through Rx14 represent the receive data lines from the switching circuit 42 to the communication modules 1–14. The large "dots" in FIGS. 3-4 correspond to electrical connections within the switching circuit 42.

In the example shown in FIG. 3, the switching circuit 42 is configured to connect Tx1 to Rx2, Tx10 to Rx4, Tx3 to Rx6, and Tx6 to Rx9. Such a configuration of the switching circuit 42 creates concurrent serial data transfer links from the communication module 1 to the communication module 2, and from the communication module 10 to the communication module 4, and from the communication module 3 to the communication module 6, and from the communication module 6 to the communication module 9.

In the example configuration of FIG. 4, the switching circuit 42 creates serial data transfer links from the communication module 4 to the communication module 2, and from the communication module 12 to the communication module 3, and from the communication module 3 to the communication module 12, and from the communication module 8 to the communication module 14. In addition, the switching circuit 42 is configured for a multi-cast serial data transfer from the communication module 7 to the communication modules 6-9.

Figure 5:
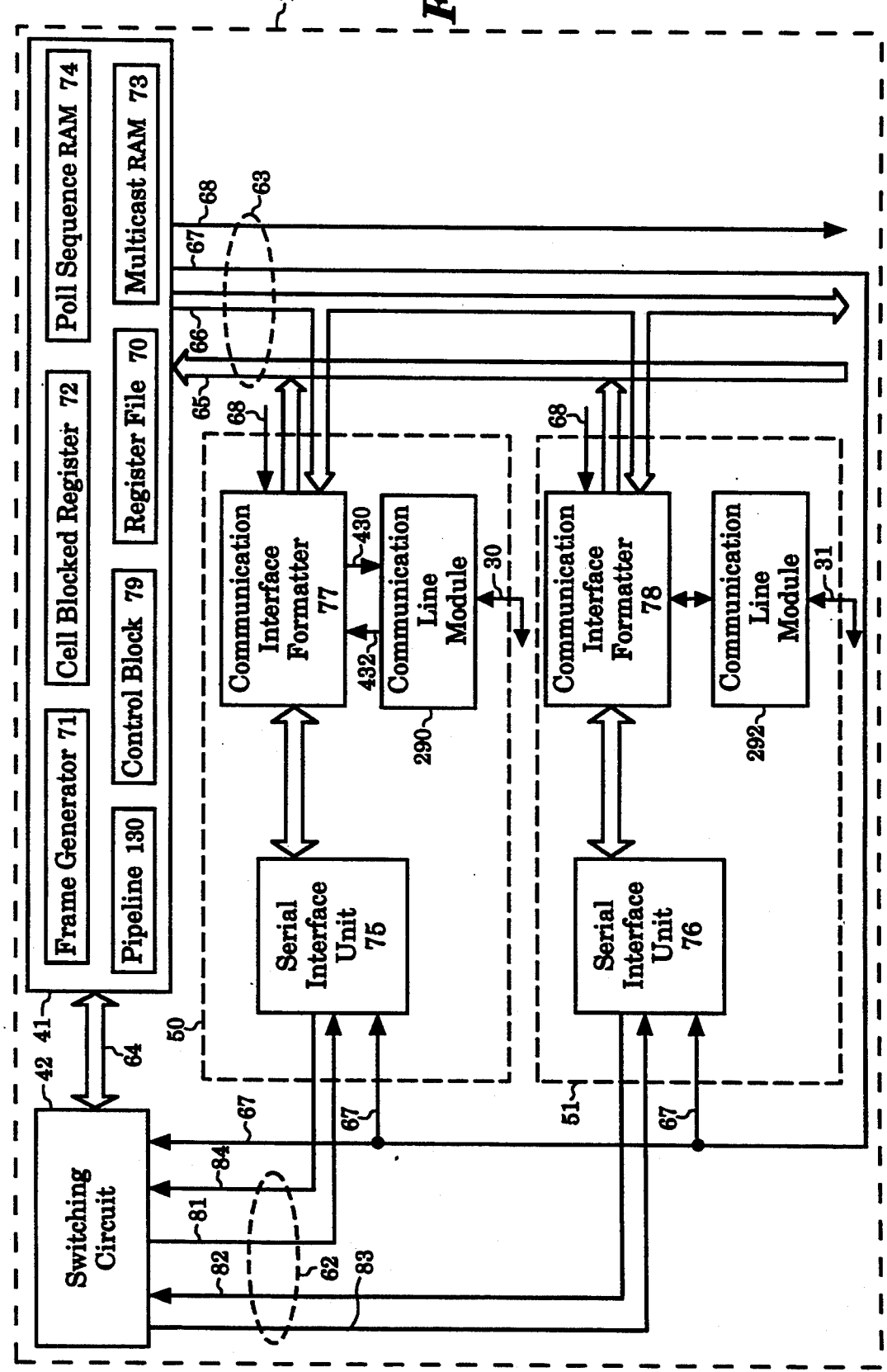
FIG. 5 is a block diagram of a broadband cell exchange unit that functionally illustrates serial communication between a pair of communication modules through the cell exchange lines.

FIG. 5 is a block diagram of the BCX 21 that functionally illustrates serial communication between the communication modules 50 and 51 through the cell exchange lines 62. The communication module 50 is comprised of a serial interface unit (SIU) 75, a communication interface formatter (CIF) 77, and a communication line module (LM) 290. Similarly, the communication module 51 is comprised of an SIU 76, a CIF 78, and an LM 292.

The CIF 77 transfers communication cells over the broadband communication link 30 through the LM 290. The CIF 78 transfers communication cells over the broadband communication link 31 through the LM 292. The CIF 77 and the CIF 78 also process polls from the arbiter 41 over the arbitration/control bus 63.

The SIU 75 and the SIU 76 enable serial communication through configured serial data transfer links in the switching circuit 42 over the cell exchange lines 62. The cell exchange lines 62 comprise multiple pairs of transmit and receive data lines. The cell exchange lines 62 include a transmit data line 80 and a receive data line 81 coupled to the SIU 75, and a transmit data line 82 and a receive data line 83 coupled to the SIU 76.

The CIF 77 receives inbound communication cells from the broadband communication link 30, and determines the destination communication module(s) for the inbound communication cells from among the communication modules 50-53. The CIF 77 encapsulates the inbound communication cells into an internal cell frame format, and transfers the cell frames to the SIU 75. The SIU 75 transfers the cell frames over the transmit data line 80 through the switching circuit 42 to the appropriate destination communication module(s).

The SIU 75 receives serial data over the receive data line 81, and performs clock frame recovery and data recovery. The SIU 75 receives cell frames containing outbound communication cells over the receive data line 81, and transfers the cell frames to the CIF 77. The CIF 77 disassembles the cell frames into outbound communication cells, and transfers the outbound communication cells to the broadband communication link 30.

Similarly, the CIF 78 receives inbound communication cells from the broadband communication link 31, and determines the destination communication module(s) from among the communication modules 50-53. The CIF 78 encapsulates the inbound communication cells into cell frames, and transfers the cell frames to the SIU 76. The SILT 76 transfers the cell frames over the transmit data line 82 through the switching circuit 42. The SIU 76 receives the cell frames over the receive data line 83, performs clock and data recovery, and transfers the cell frames to the CIF 78. The CIF 78 disassembles the cell frames into outbound communication cells, and transfers the outbound communication cells to the broadband communication link 31.

The arbiter 41 causes the switching circuit 42 to selectively couple the transmit data lines from the communication modules 50-53 to the receive data lines of the communication modules 50-53. For example, switching circuit 42 selectively couples the transmit data line 80 to the receive data line 83, and selectively couples the transmit data line 82 to the receive data line 81. For one embodiment, the switching circuit 42 is a crosspoint switch.

The arbiter 41 generates a FRAME signal 67 to synchronize serial communication over the cell exchange lines 62 and to control the polling sequence over the arbitration/control bus 63. The FRAME signal 67 determines the boundaries of a series of time frames (FRAMEs) for transferring cell frames over the cell exchange lines 62 and for polling the communication modules 50-53.

The arbiter 41 configures the switching circuit 42 by transferring configuration data to the switching circuit 42 over a configuration bus 64. The configuration data determines serial data transfer links between the transmit and receive data lines of the cell exchange lines 62. The configuration data is stored in a set of configuration registers (not shown) in the switching circuit 42. The configuration registers comprise a double buffered arrangement of first and second register sets. One register set having an active status controls current configuration of the switching circuit 42, while the other set having a nonactive status are available to receive configuration data from the arbiter 41. The FRAME signal 67 causes the switching circuit 42 to transfer the configuration data from the nonactive register set to the active register set.

During a current FRAME, the arbiter 41 polls the communication modules 50-53 to determine transmission requests for the next FRAME. Also during the current FRAME, the communication modules 50-53 transmit cell frames over serial data transfer links in the cell exchange lines 62 that were granted during the previous FRAME.

Before the next FRAME begins, the arbiter 41 transfers configuration data for the next FRAME to the nonactive configuration registers of the switching circuit 42. Thereafter, the FRAME signal 67 corresponding to the start of the next FRAME transfers data from the nonactive to active configuration registers, thereby reconfiguring of the switching circuit 42. During the next FRAME, the arbiter 41 again polls the communication modules 50-53 for transmission requests, while cell frames are transferred through the configured serial data transfer links in the switching circuit 42.

The arbitration/control bus 63 includes a polling bus 66 and a response bus 65, and a grant signal 68. The arbiter 41 individually polls the CIF 77 and the CIF 78 over the polling bus 66. The arbiter 41 issues two basic types of polls over the polling bus 66: a single-destination poll, and a multi-cast poll. In turn, the CIF 77 and the CIF 78 respond with either a single-destination request, a multi-cast request, or a null request over the response bus 65. If the destination for the transmission request is available, the arbiter 41 issues the grant signal 68.

For example, after receiving an inbound communication cell over the broadband communication link 30, the CIF 77 holds the communication cell while waiting for a poll from the arbiter 41. When the arbiter 41 issues a single-destination poll to the CIF 77, the CIF 77 responds with a single destination request if the communication cell has only one destination among the communication modules 50-53. However, if the communication cell has multiple destinations, the CIF 77 waits for a multi-cast poll from the arbiter 41, and then responds with a multi-cast request.

The arbiter 41 is comprised of a FRAME generator 71, a register file 70, a cell-blocked register (CBR) 72, a poll sequence RAM (PSR) 74, a multicast RAM (MCR) 73, a series of pipeline registers (pipeline) 130, and a control block 79.

The FRAME generator 71 includes an oscillator circuit for generating the FRAME signal 67 and synchronizing the accesses to a set of poll sequence vectors stored in the PSR 74. The oscillator circuit of the FRAME generator 71 synchronizes the communication modules 50-53 to the polling intervals.

The control block 79 processes pipelined requests from the communication modules 50-53, and determines whether the requests are granted or not granted. If the requests are granted, the switching circuit 42 is reconfigured at the appropriate time.

The pipeline 130 aligns and stores poll vectors and response vectors during sequential processing by the control block 79. The pipeline 130 provides the poll vectors and the response vectors to the switching circuit 42 at the appropriate time for configuration.

The MCR 73 stores multicast group information. When one of the communication modules 50-53 generates a multicast request, the destination addresses corresponding to the requesting communication module are read out of the MCR 73.

The polling sequence for the communication modules 50-53 employed by the arbiter 41 is determined by a set of polling vectors stored in the PSR 74. Each polling vector contains a sequence of communication module identifiers. For one embodiment, the communication modules 50-53 comprise a set of 14 communication modules, and the communication module identifiers correspondingly range from 1-14.

During each FRAME, the arbiter 41 reads a polling vector from the PSR 74 to determine a polling sequence for the FRAME. During subsequent FRAMEs, the arbiter 41 reads sequentially through the PSR 74 in a circular fashion to determine the polling sequences for the subsequent FRAMEs. The control processor 40 determines the priority of each of the communication modules 50-53 by preprogramming the polling vectors into the PSR 74.

The PSR 74 is comprised of two banks. While one bank of the PSR 74 is accessed by the arbiter 41, the other bank can be modified by the control processor 40. Thereafter, the two banks of the PSR 74 can be switched by the arbiter 41 such that the poll sequence priorities for the communication modules 50-53 are updated without interruption of the cell processing.

A PSR terminal count register in the register file 70 determines the number of polling vectors read from the PSR 74 before the polling sequence is restarted. The control processor 40 updates the PSR terminal count register to maintain fairness in the polling sequence when communication modules are installed or removed from the communication controller 200.

Each polling vector in the PSR 74 includes a multicast enable bit for enabling multicast requests. Multicasting is only allowed when the multicast enable bit is logged. The bandwidth of multicast cells is controlled the frequency of multicast enable bit in the polling vectors.

The MCR 73 stores a set of multi-cast polling vectors for the communication modules 50-53. Each multi-cast polling vector corresponds to a unique request identifier, and contains module indentifiers that indicate the destinations for a multi-cast request from any communication module. The MCR 73 is preprogrammed by the control processor 40.

The arbiter 41 logs "blocked" destinations in the CBR 72 to prevent multiple grants to the same destination during a single FRAME. For example, after the arbiter 41 transmits a single-destination poll to CIF 77, the CIF 77 responds with a single-destination request specifying communication module 2 as the destination. If the module identifier for communication module 2 is not logged in the CBR 72, the arbiter 41 issues a grant signal 68 to the CIF 77. The arbiter 41 also logs the module identifier for communication module 2 in the CBR 72 to indicate communication module 2 as a blocked destination. Thereafter in the same FRAME, if another communication module responds to a poll by requesting communication module 2 as a destination, the arbiter 41 does not issue the grant signal 68 because the CBR 72 logs communication module 2 as blocked.

FIG. 6 illustrates a series of single-destination transmission requests over the arbitration/control bus 63 from the communication module 50, and cell frame transfers over the transmit data line 80 from the communication module 50. The transmission requests and cell frame transfers occur within a series of FRAMEs (FRAME N - FRAME N+6). Each FRAME N - FRAME N+6 indicates the type of transmission request received during polling, whether or not the transmission request is granted, and activity on the transmit data line 80.

During FRAME N, the CIF 77 responds to a single-destination poll from the arbiter 41 with a single-destination request for connection to the communication module 2 because a cell frame is ready for transmission. The transmit data line 80 is idle, and the arbiter 41 issues the grant signal 68 to grant the request for connection to the communication module 2. Between FRAMEs N and N+1, the arbiter 41 configures a serial data transfer link through the switching circuit 42 for the transmission request to communication module 2.

During FRAME N+1, the SIU 75 transmits the cell frame over the transmit data line 80 through the switching circuit 42 to the communication module 2. The CIF 77 responds to a single-destination poll from the arbiter 41 with a single-destination request for connection to the communication module 3 because another cell frame is ready for transmission. The arbiter 41 issues the grant signal 68 to grant the request for connection to the communication module 3. Between FRAMEs N+1 and N+2, the arbiter 41 configures a serial data transfer link through the switching circuit 42 for the transmission request to communication module 3.

During FRAME N+2, the SILT 75 transmits the cell frame over the transmit data line 80 through the switching circuit 42 to the communication module 3. The CIF 77 responds to a single-destination poll from the arbiter 41 with a null request because a cell frame is not ready for transmission. As a consequence, the arbiter 41 does not issue the grant signal 68.

During FRAME N+3, the transmit data line 80 is idle. The CIF 77 responds to a single-destination poll with a single-destination request for connection to the communication module 4. The arbiter 41 does not issue the grant signal 68 because the communication module 4 is logged as blocked in the CBR 72.

During FRAME N+4, the transmit data line 80 is idle. The CIF 77 repeats the single-destination request for connection to the communication module 4. However, the arbiter 41 again does not issue the grant signal 68 because the communication module 4 is logged as blocked in the CBR 72.

During FRAME N+5, the transmit data line 80 is idle. The CIF 77 repeats the single-destination request for connection to the communication module 4. The arbiter 41 issues the grant signal 68 because the communication module 4 is not logged as blocked in the CBR 72. Between FRAMEs N+5 and N+6, the arbiter 41 configures a serial data transfer link through the switching circuit 42 for the transmit request to communication module 4. Thereafter during FRAME N+6, the SIU 75 transmits the cell frame to the communication module 4.

FIG. 7 illustrates a series of single-destination and multi-cast transmission requests from communication module 50 over the arbitration/control bus 63, and cell frame transfers over the transmit data line 80 from the communication module 50. The transmission requests and cell frame transfers correspond to a series of FRAMEs (FRAME M - FRAME M+6).

During FRAME M, the transmit data line 80 is idle. The CIF 77 responds to a single-destination poll from the arbiter 41 with a null request because a cell frame is not ready for transmission.

During FRAME M+1, the transmit data line 80 is idle. The arbiter 41 issues a multi-cast poll because the multicast enable bit is true in the PSR 74. The CIF 77 responds to the multi-cast poll with a multi-cast request because a cell frame is ready for a multi-cast transmission. The multi-cast request is granted when the arbiter 41 issues the grant signal 68.

During FRAME M+2 and FRAME M+3, the arbiter 41 accesses the MCR 73 to configure the switching circuit 42 for the multi-cast. The arbiter 41 also receives two null requests from the CIF 77.

During FRAME M+4, the SIU 75 transmits the cell frame over the transmit data line 80 to the communication modules specified in the MCR 73 through the configured multi-cast serial data transfer links in the switching circuit 42. The CIF 77 responds to a single-destination poll with a single destination request. The single-destination request is granted. Between FRAMEs M+4 and M+5, the arbiter 41 configures a serial data transfer link through the switching circuit 42 for the transmission request.

During FRAME M+5, the SILT 75 transmits a cell frame over the transmit data line 80, and the CIF 77 issues a null request. During FRAME M+6, the transmit data line 80 is idle, and the CIF 77 issues a null request.

Figure 8:
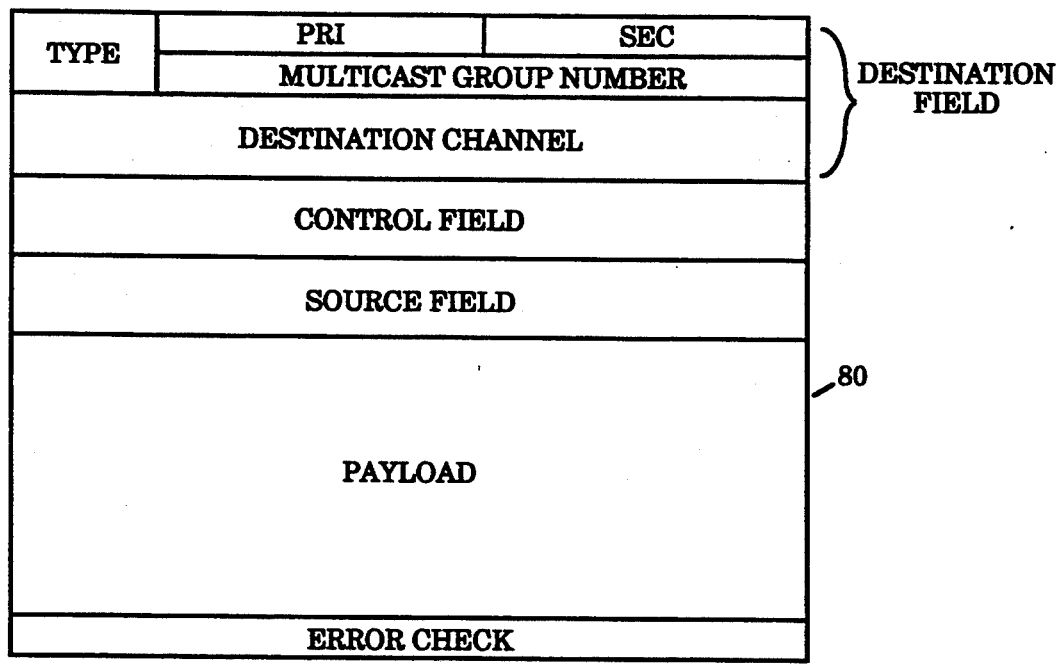
FIG. 8 illustrates the format for a cell frame transferred over the cell exchange lines.

FIG. 8 illustrates the format for a cell frame 80. The cell frame 80 has a header field comprising a destination field, a control field, a source address. The destination field specifies the destination communication module 50-53 for the cell frame 80. The source field specifies the source communication module 50-53 for the cell frame 80. The cell frame 80 also contains an error check word.

The destination field of the cell frame 80 includes a type field (TYPE), and either a primary destination address (PRI DEST) and a secondary destination address (SEC DEST), or a multicast group number. The type field specifies whether the cell frame 80 is a single destination cell frame, a multicast cell frame, a null cell frame, or a test cell frame.

If the type field specifies a single destination cell, the primary destination address specifies the primary communication module destination for the cell frame 80 and the secondary destination address specifies a backup communication module destination for the cell frame 80.

If the type field specifies a multicast cell, the multicast group number specifies a group of multicast destinations in the MCR 73.

Null cell frames are transferred during data FRAMEs through unconfigured links in the switching circuit 42 to maintain bit synchronization in the data receivers of the SIUs.

Figure 9:
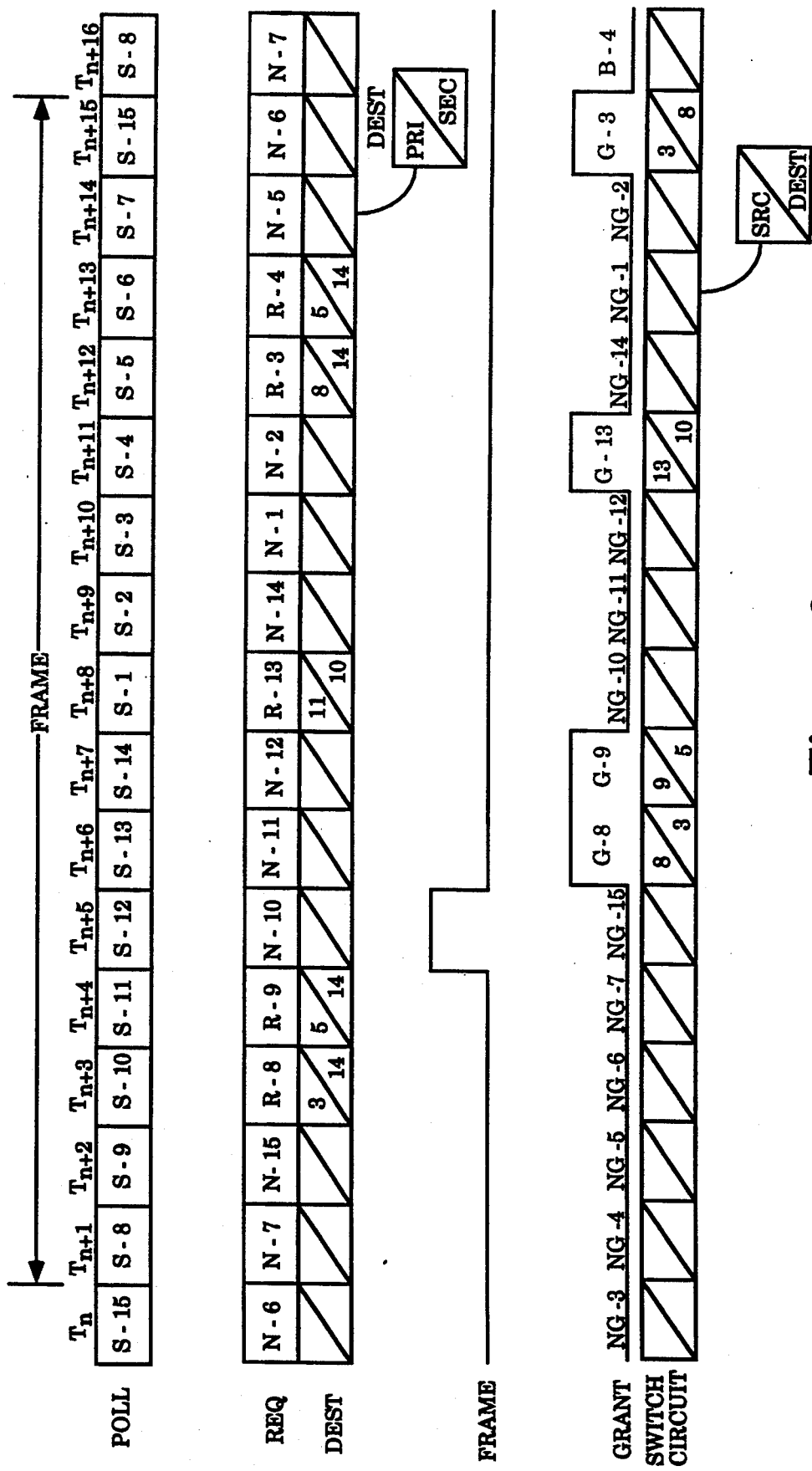
FIG. 9 illustrates the timing of an example polling sequence over the arbitration/control bus, wherein the polling sequence is divided into a series of timeslots $T_{n+1}$-$T_{n+15}$.

FIG. 9 illustrates the timing of an example polling sequence over the arbitration/control bus 63. The polling sequence is divided into a series of timeslots $T_n$-$T_{n+16}$. FIG. 9 illustrates polls from the arbiter 41 over the poll bus 66 (POLL), requests (REQ) from the communication modules 1-14 and the corresponding destination addresses (DEST) over the response bus 66, the FRAME signal 67, the grant signal 68 as well as the switching circuit 42 configuration data (SWITCH CIRCUIT SRC/DEST). The example polling sequence shown illustrates a FRAME in which multiple single destination requests are granted and written to the switching circuit 42, as well as a blocked request and a request to a nonfunctional control module which is remapped to a secondary control module.

When a communication module generates a single destination request, the request includes a primary and a secondary destination. The arbiter 41 reads a register in the register file 70 that indicates whether the communication module for the primary destination is nonfunctional. The secondary destination functions as a backup when the primary destination is nonfunctional. The communication module that originates the cell frame is not notified of a redirection of cell frame to the secondary destination.

The notation for the destination address is DEST (PRI, SEC). For this example, the communication module 11 is "nonfunctional" and the communication module 10 is a "backup" destination for the communication module 11.

During timeslot $T_n$, the arbiter 41 issues a null poll over the polling bus 66. Null poll timeslots are used by the arbiter 41 to reconfigure the switching circuit 42. The arbiter 41 also receives a null request from communication module 6 (N-6) over the response bus 65. The null request N-6 results from a poll to communication module 6 during the timeslot two prior. The arbiter 41 does not issue a grant to communication module 3 (NG-3) from a preceding poll.

For one embodiment comprising communication modules 1-14, the null poll is indicated by a single-destination poll over the polling bus 66 targeted for communication module 15 (S-15). The poll S-15 is the null poll because the communication module 15 does not exist. However, for another embodiment, the communication module 15 does exist and the null poll has a different communication module identifier.

During timeslot $T_{n+1}$, the arbiter 41 issues a single-destination poll for communication module 8 (S-8) over the polling bus 66. The arbiter 41 also receives a null request from communication module 7 (N-7) over the response bus 65. The arbiter 41 does not issue a grant to communication module 4 (NG-4).

During timeslot $T_{n+2}$, the arbiter 41 issues a single-destination poll to communication module 9 (S-9). The null request (N-15) corresponds to the null poll during the timeslot Tn. The arbiter 41 does not issue a grant to communication module 5 (NG-5).

During timeslot $T_{n+3}$, the arbiter 41 issues a single-destination poll to communication module 10 (S-10), and receives a single-destination request from communication module 8 (R-8) for DEST (3,14). The single-destination request R-8 results from the single-destination poll S-8 during the timeslot $T_{n+1}$. The arbiter 41 does not issue a grant to communication module 6 (NG-6).

During $T_{n+4}$, the arbiter 41 issues a single-destination poll to communication module 11 (S-11), and a single-destination request from communication module 9 (R-9) for DEST (5,14). The request R-9 corresponds to the poll S-9 during the timeslot $T_{n+2}$. The arbiter 41 does not issue a grant to communication module 7 (NG-7).

During timeslot $T_{n+5}$, the arbiter 41 issues a single-destination poll to communication module 12 (S-12), and receives a null request from communication module 10 (N-10). The arbiter 41 does not issue a grant for the null poll (NG-15).

During timeslot $T_{n+6}$, the arbiter 41 issues a single-destination poll to communication module 13 (S-13), and receives a null request from communication module 11 (N-11) resulting from the poll S-11. The arbiter 41 issues a grant to communication module 8 (G-8) by asserting the grant signal 68. The grant signal G-8 results from the request R-8 during timeslot $T_{n+3}$. The switching circuit 42 is configured to connect the transmitter of the communication module 8 to the receiver of the communication module 3 during the next FRAME. Also, the destination communication module 3 is logged in the CBR 72. The arbiter 41 asserts the FRAME signal 67 to start a transmit FRAME over the switched serial lines 62.

During $T_{n+7}$, the arbiter 41 issues a single-destination poll to communication module 14 (S-14), and receives a null request from communication module 12 (N-12). The arbiter 41 issues a grant to communication module 9 (G-9) corresponding to the request R-9 during timeslot $T_{n+4}$. The switching circuit 42 is configured to connect the transmitter of the communication module 9 to the receiver of the communication module 5 during the next FRAME. Also, the destination communication module 5 is logged in the CBR 72.

During timeslot $T_{n+8}$, the arbiter 41 issues a single-destination poll for communication module 1 (S-1), and receives a single-destination request from communication module 13 (R-13) for DEST (11,10) resulting from the poll S-13 during timeslot $T_{n+6}$. No grant is issued to communication module 10 (NG-10) due to the null request N-10 during timeslot $T_{n+5}$.

During timeslot $T_{n+9}$, the arbiter 41 issues a single-destination poll for communication module 2 (S-2), and receives a null request from communication module 14 (N-14) resulting from the poll S-14 during timeslot $T_{n+7}$. No grant is issued to communication module 11 (NG-11) due to the null request N-11 during timeslot $T_{n+6}$.

During timeslot $T_{n+10}$, the arbiter 41 issues a single-destination poll to communication module 3 (S-3), and receives a null request from communication module I (N-1) resulting from the poll S-1 during timeslot $T_{n+8}$. No grant is issued to communication module 12 (NG-12) due to the null request N-12 during timeslot $T_{n+7}$.

During timeslot $T_{n+11}$, the arbiter issues single destination poll to communication module 4 (S-4) and receives a null request for communication module 2 (N-2). The arbiter 41 issues a grant to communication module 13 (G-13) resulting from the request R-13 during timeslot $T_{n+8}$. The switching circuit 42 is configured to connect the transmitter of the communication module 13 transmitter to the receiver of the communication module 10 during the next FRAME, and destination 10 is logged in the CBR 72. The secondary destination (10) is used because the control block 79 determined that the primary destination (11) is nonfunctional.

During timeslot $T_{n+12}$, the arbiter issues single destination a poll to communication module 5 (S-5) and receives a single destination request from communication module 3 (R-3) for DEST (8,14). No grants are issued to communication module 14 (NG-14) due to the null request during timeslot $T_{n+9}$.

During timeslot $T_{n+13}$, the arbiter 41 issues a single-destination poll to communication module 6 (S-6), and receives a single destination request from communication module 4 (R-4) for DEST (5,14). No grants are issued to communication module 1 (NG-1) due to the null request during timeslot $T_{n+10}$.

During timeslot $T_{n+14}$, the arbiter 41 issues a single-destination poll to communication module 7 (S-7), and receives a null request from communication module 5 (N-5). No grant is issued to communication module 2 (NG-2) due to the null request N-2 during timeslot $T_{n+11}$.

During timeslot $T_{n+15}$, the arbiter 41 issues a null poll (S-15), and receives a null request from communication module 6 (N-6). The arbiter 41 issues a grant to communication module 3 (G-3) resulting from the request R-3 during timeslot $T_{n+12}$. The switching circuit 42 is configured to connect the receiver of the communication module 3 to the receiver of the communication module 8 during the next FRAME, and the destination 8 is logged in the CBR 72.

During timeslot $T_{n+16}$, the arbiter 41 issues a single-destination poll to communication module 8 (S-8), and receives a null request from communication module 7 (N-7). The arbiter 41 does not issue a grant to communication module 4 (B-4) because the requested destination (5) is logged as blocked in the CBR 72 after the grant (G-9) during timeslot $T_{n+7}$. The communication module 4 repeats the request during the next poll to communication module 4.

Figure 10A:
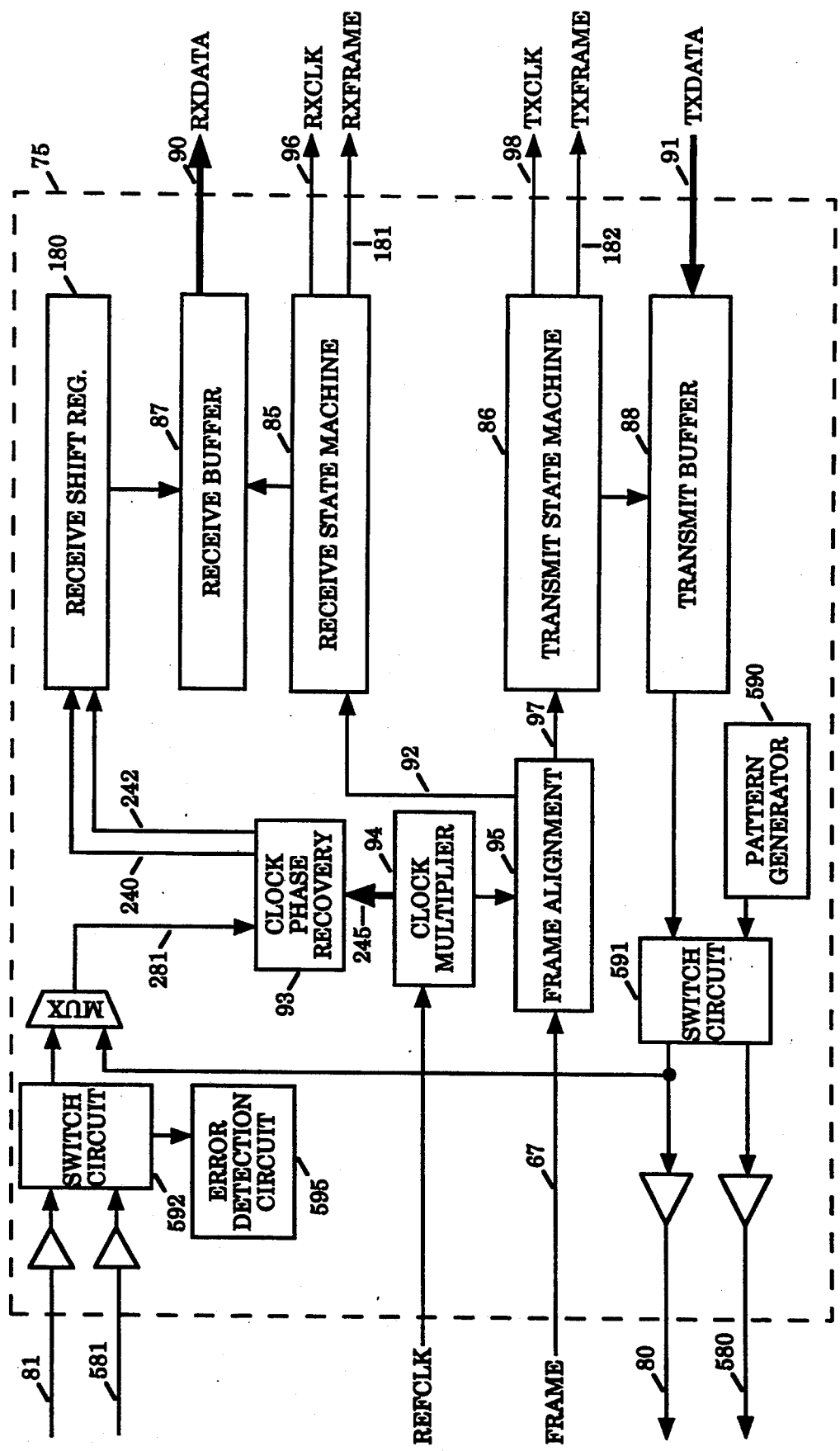
FIGS. 10a–10c illustrate a serial interface unit comprising a serial data transmit portion, and a serial data receive portion, wherein the serialized data receive portion includes a phase recovery circuit.

FIG. 10a is a block diagram of the SIU 75. The receive portion of the SIU 75 comprises a receive state machine 85, a receive buffer 87, a receive shift register 180, a clock phase recovery circuit 93, a clock multiplier 94, and a frame alignment circuit 95, a pattern generator 590, and an error detection circuit 595.

The clock phase recovery circuit 93 performs phase alignment for data input to both the receive shift register 180 and the error detection circuit 595 by detecting bit boundaries on a receive serial data line 281, and adjusting a sampling point for the received serial data. The clock phase recovery circuit 93 generates an aligned serial data signal 240 and an aligned serial clock 242 for shifting receive data into the receive shift register 180.

The clock phase recovery circuit 93 performs phase alignment while receiving a bit synchronization pattern over the receive serial data line 281. The clock phase recovery circuit 93 locks to an optimal sampling point when a frame alignment pattern is detected. At the end of a FRAME, the clock phase recovery circuit 93 resumes the phase recovery function.

The frame alignment circuit 95 receives the FRAME signal 67, and generates a DFRAME signal 92 for the receive state machine 85 and a BFRAME signal 97 for the transmit state machine 86.

The receive state machine 85 controls clock and data recovery over the receive serial data line 281. The receive shift register 180 samples cell flames received over the receive serial data line 281. The receive buffer 87 assembles the cell frames. The cell frames are transferred to the CIF 77 over a receive data bus (RxDATA) 90. The receive state machine 85 generates a receive clock (RxCLK) 96 and a receive frame boundary signal (RxFRAME) 181 to synchronize the data on the RxDATA 90.

The transmit portion of the SIU 75 comprises a transmit machine 86, and a transmit buffer 88. The transmit state machine 86 controls serial data transmission over the transmit data line 80. The transmit buffer 88 receives cell frames from the CIF 77 over a transmit data bus (TxDATA) 91. The transmit state machine 86 generates a transmit clock (TxCLK) 98 and a transmit FRAME boundary signal (TxFRAME) 182 to synchronize the data on the TxDATA 91.

The clock multiplier 94 receives an input from a free running oscillator (REFCLK) and generates a set of oversampling clocks 245. For one embodiment, the oversampling clocks 245 comprise a set of 6 clock signals running at 800 MHz, wherein the clock signals are staggered 60 degrees out of phase. The oversampling clocks 245 provide a 6 phase sampling clock input for the clock phase recovery circuit 93. The oversampling clocks 245 are referred to as the oversampling clocks 1-6.

Figure 10B:
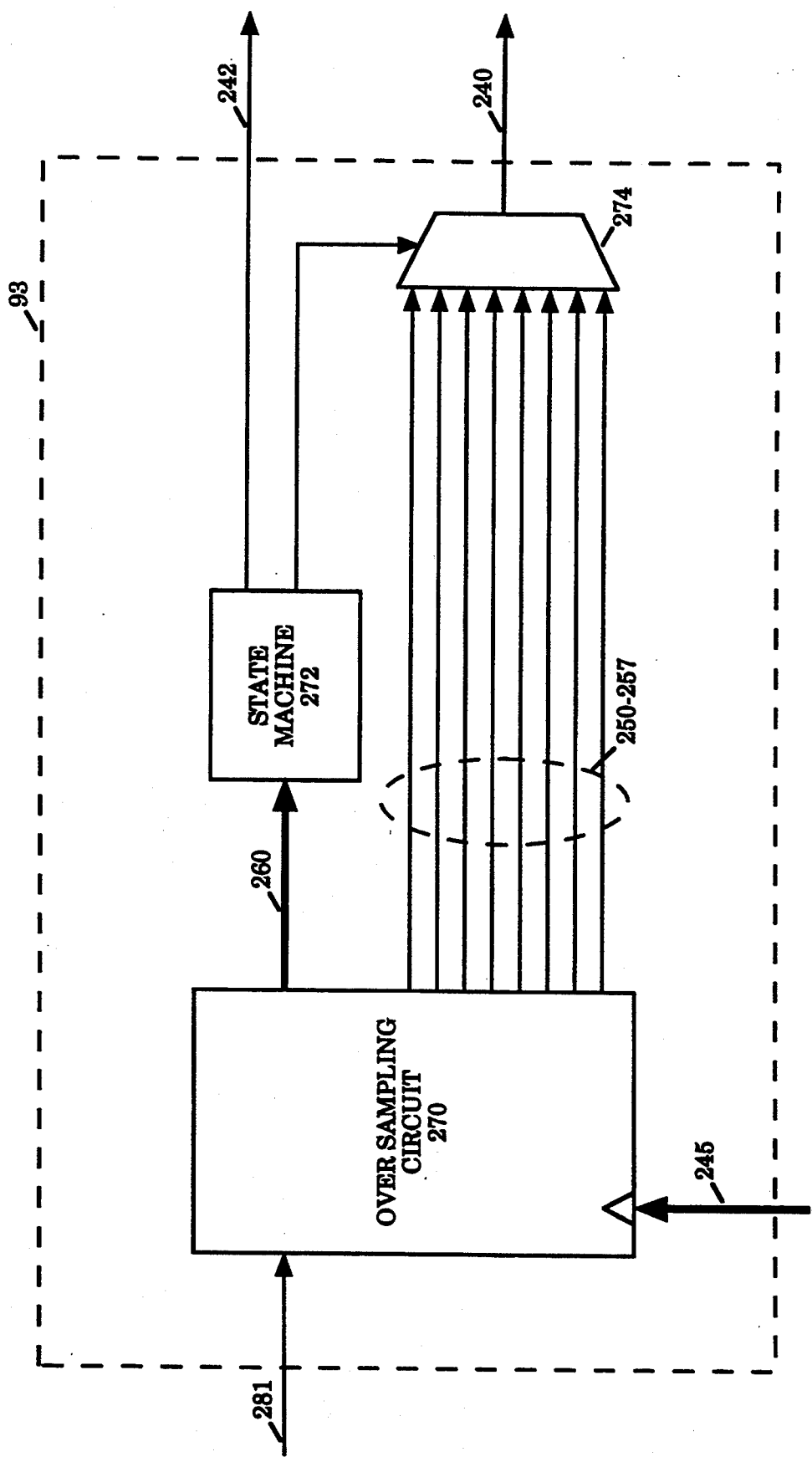

FIG. 10b is a block diagram of the clock phase recovery circuit 93. The clock phase recovery circuit 93 comprises an oversampling circuit 270, a state machine 272, and a multiplexer 274. The clock phase recovery circuit 93 performs phase recovery while receiving the bit synchronization pattern. For one embodiment, the bit synchronization pattern is an alternating pattern of ones and zeros.

The oversampling circuit 270 performs 6 times oversampling of the serial data bits received over the receive serial data line 281. The oversampling circuit 270 generates a set of control signals 260 that indicate a location of a data edge of the serial data bits in relation to the oversampling clocks 245. A data edge of the serial data bits received over the receive serial data line 281 occurs with either a high to low bit transition, or a low to high bit transition.

The control signals 260 indicate whether a data edge occurs between the oversampling clocks 6 and 1 (6-1), or between the oversampling clocks 1 and 2 (1-2), or between the oversampling clocks 2 and 3 (2-3), or between the oversampling clocks 3 and 4 (3-4), or between the oversampling clocks 4 and 5 (4-5), or between the oversampling clocks 5 and 6 (5-6).

The oversampling circuit 270 also generates a set of phase aligned data signals 250-257. The phase aligned data signals 250-257 are the serial data bits received over the receive serial data line 281, and sampled by each phase of the oversampling clocks 1-6. The phase aligned data signal 250 is sampled by the oversampling clock 1, the phase aligned data signal 251 is sampled by the oversampling clock 2, the phase aligned data signal 252 is sampled by the oversampling clock 3, the phase aligned data signal 253 is sampled by the oversampling clock 4, the phase aligned data signal 254 is sampled by the oversampling clock 5, the phase aligned data signal 255 is sampled by the oversampling clock 6. In addition, the phase aligned data signal 256 is sampled by the oversampling clock 1 delayed one bit time, and the phase aligned data signal 257 is sampled by the oversampling clock 2 delayed one bit time.

The state machine 272 causes the multiplexer 274 to couple one of the phase aligned data signals 250-257 to the aligned serial data signal 240 for input to the receive shift register 180. The state machine 272 selects one of the phase aligned data signals 250-257 for the serial data signal 240 such that transitions of the aligned serial clock 242 are substantially centered between transitions of the aligned serial data signal 240. By selecting from among the phase aligned data signals 250-257, shortened clock periods otherwise caused by clock switching are eliminated. The centering of clock transitions between data signal transitions provides an optimal sampling point for the receive shift register 180. The optimal sampling point enables maximum tolerance of jitter in the received data without causing errors.

For one embodiment, the oversampling circuit 270 comprises a set of latches for sampling the serial data bits received over the receive serial data line 281. Sampling of the serial data bits received over the receive serial data line 281 is synchronized by the oversampling clocks 245.

Figure 10C:
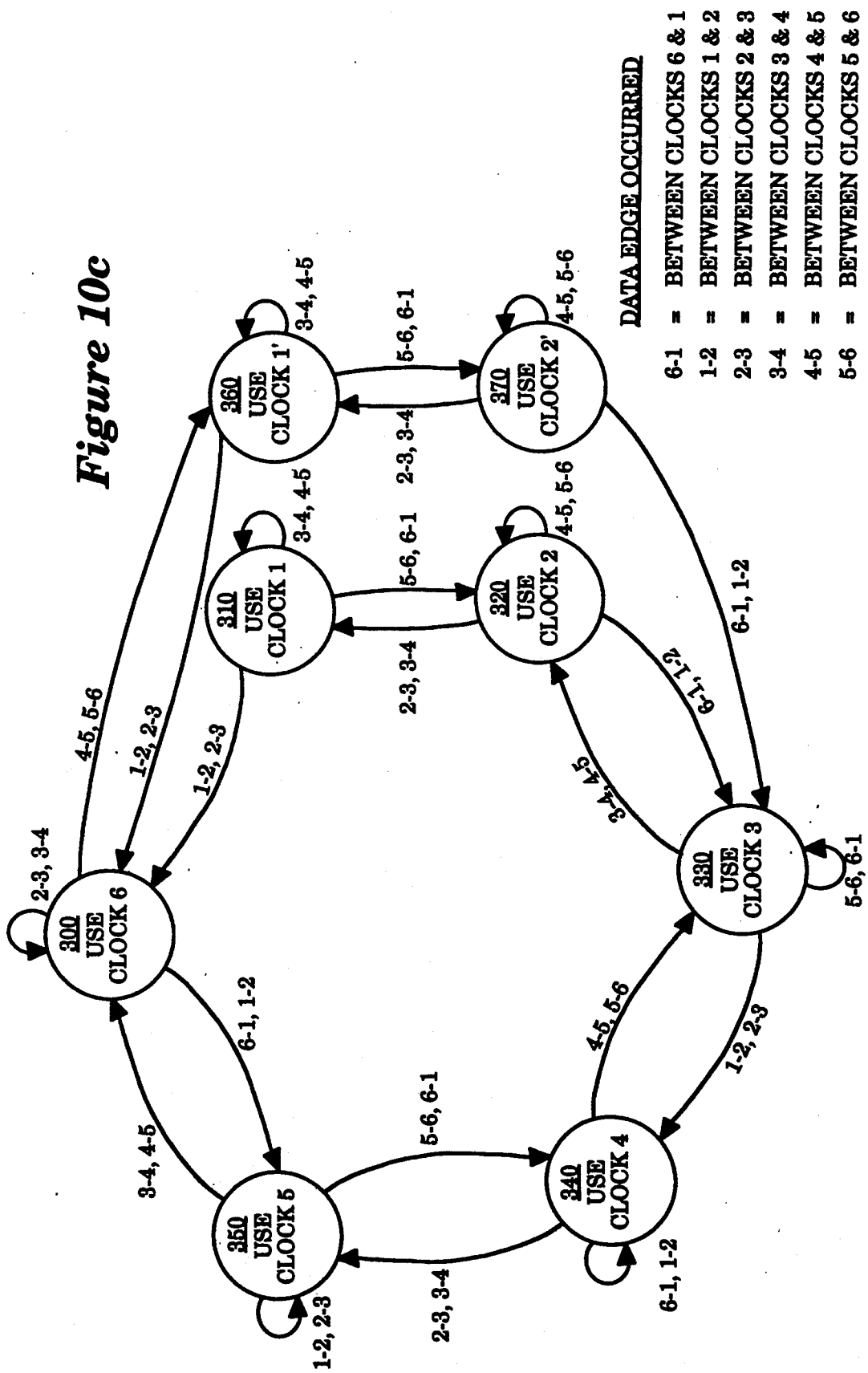

FIG. 10c is a state diagram illustrating the operation of the state machine 272. The state machine 272 implements a set of states 300-370, wherein each state 300-370 specifies one of the oversampling clocks 1-6 for optimal sampling of the serial data bits received over the receive serial data line 281. The state machine 272 transitions between the states 300-370 according to the control signals 260. The state machine 272 transitions between the states 300-370 while the bit synchronization pattern is received between cell frames. The state machine 272 locks to one of the states 300-370 when the frame alignment pattern is received, and remains locked in the state during the cell frame.

The state 300 specifies the oversampling clock 6, the state 310 specifies the oversampling clock 1, the state 320 specifies the oversampling clock 2, the state 330 specifies the oversampling clock 3, the state 340 specifies the oversampling clock 4, and the state 350 specifies the oversampling clock 5. In addition, the state 360 specifies the oversampling clock 1 delayed by one bit time (CLOCK 1'), and the state 370 specifies the oversampling clock 2 delayed by one bit time (CLOCK 2'). The overlapping states 360 and 370 provide a high level of jitter tolerance during phase acquisition while not causing errors.

For example, at the state 300, the state machine 272 uses the oversampling clock 6 to sample the serial data bits received over the receive serial data line 281. At the state 300, the state machine 272 causes the multiplexer 274 to couple the phase aligned data signal 255 (which is sampled by the oversampling clock 6) to the aligned serial data signal 240.

At the state 300, if the control signals 260 indicate a data bit transition between oversampling clocks 2 and 3 (2–3) or between oversampling clocks 3 and 4 (3–4), the state machine 272 remains in the state 300.

At the state 300, if the control signals 260 indicate a data bit transition between oversampling clocks 4 and 5 (4–5) or between oversampling clocks 5 and 6 (5–6), the state machine 272 transitions to the state 360.

At the state 300, if the control signals 260 indicate a data bit transition between oversampling clocks 6 and 1 (6–1) or between oversampling clocks 1 and 2 (1–2), the state machine 272 transitions to the state 350.

At the state 310, the state machine 272 causes the multiplexer 274 to couple the phase aligned data signal 250 (which is sampled by the oversampling clock 1) to the aligned serial data signal 240. At the state 320, the state machine 272 causes the multiplexer 274 to couple the phase aligned data signal 251 (which is sampled by the oversampling clock 2) to the aligned serial data signal 240. At the state 330, the state machine 272 causes the multiplexer 274 to couple the phase aligned data signal 252 (which is sampled by the oversampling clock 3) to the aligned serial data signal 240. At the state 340, the state machine 272 causes the multiplexer 274 to couple the phase aligned data signal 253 (which is sampled by the oversampling clock 4) to the aligned serial data signal 240. At the state 350, the state machine 272 causes the multiplexer 274 to couple the phase aligned data signal 254 (which is sampled by the oversampling clock 5) to the aligned serial data signal 240. At the state 360, the state machine 272 causes the multiplexer 274 to couple the phase aligned data signal 256 (which is sampled by the oversampling clock 1 delayed one bit time) to the aligned serial data signal 240. At the state 370, the state machine 272 causes the multiplexer 274 to couple the phase aligned data signal 257 (which is sampled by the oversampling clock 2 delayed one bit time) to the aligned serial data signal 240.

Figure 11:
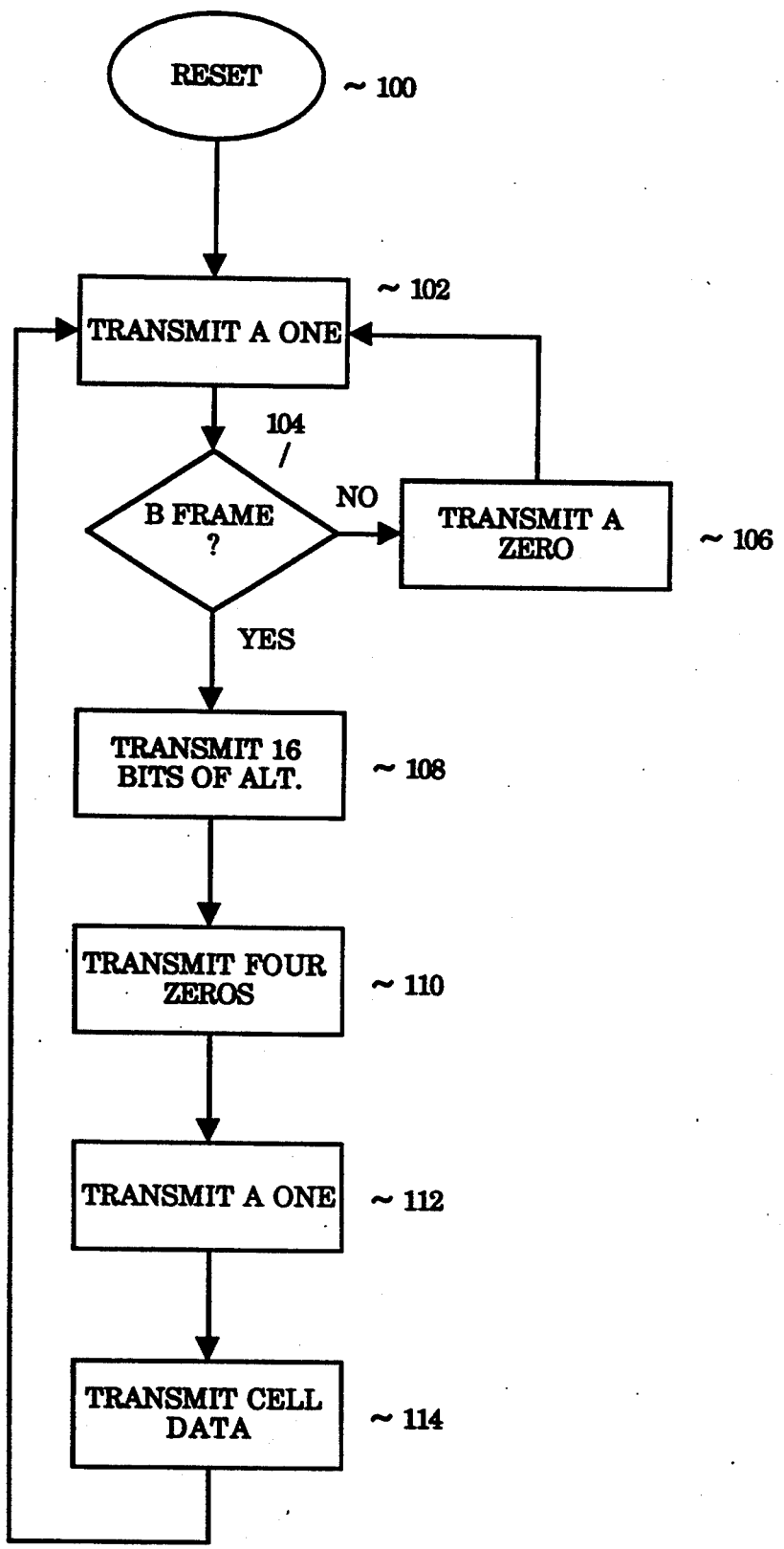
FIG. 11 is a flow diagram for the transmit state machine of a serial interface unit.

FIG. 11 is a flow diagram for the transmit state machine 86. The transmit state machine 86 proceeds from a reset state 100 to a loop comprising states 102–106. While in the loop 102–106, an alternating pattern of ones and zeros is transmitted over the transmit data line 80, wherein a one is transmitted at state 102 and a zero is transmitted at state 106. The one/zero pattern is a bit synchronization pattern that is transmitted by all SIUs between transmission of cell frames.

If the BFRAME signal 97 is high at state 104, then the transmit state machine proceeds to state 108, where 16 more bits of alternating zeros and ones are transmitted over the transmit data line 80. Thereafter at state 110, four consecutive zeros are transmitted over the transmit data line 80, followed by a one at state 112. The four zeros followed by a one comprise a frame alignment pattern that indicates the start of a cell frame transmission.

Thereafter at state 114, the cell frame is read from the transmit buffer 88 and transmitted serially over the transmit data line 80. The transmit state machine 86 then proceeds to state 102 to transmit the bit synchronization pattern until the next FRAME signal is detected.

Figure 12:
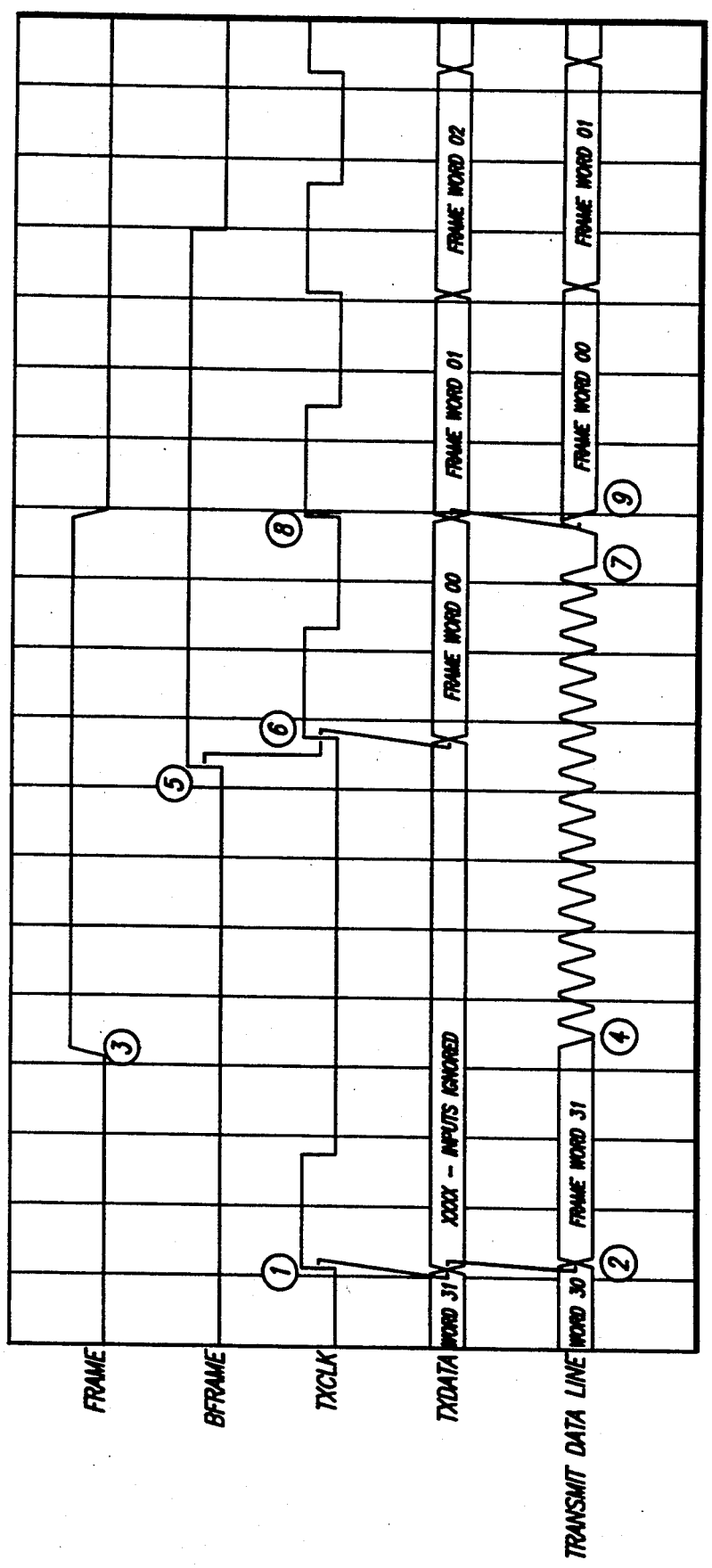
FIG. 12 is a timing diagram that illustrates the transmit function of a serial interface unit during a FRAME transition between transfers of a first cell frame and a second cell frame over a transmit data line.

FIG. 12 is a timing diagram that illustrates the transmit function of the SIU 75 during a FRAME transition between transfers of a first cell frame and a second cell frame over the transmit data line 80. The FRAME signal 67 is shown, along with the BFRAME signal 97, the TxCLK 98, the TxDATA 91, and the transmit data line 80.

At time t1, the transmit state machine 86 asserts the TxCLK 98 to sample the Word 31 of the first cell frame on the TxDATA 91, while the final bits of the Word 30 of the first cell frame are transmitted over the transmit data line 80. At time t2, the Word 31 begins transmission over the transmit data line 80.

At time t3, the arbiter 41 asserts the FRAME signal 67. Thereafter, the arbiter 41 reconfigures the switching circuit 42 while the bit synchronization pattern of alternating ones and zeros is transmitted over the transmit data line 80.

At time t5, the frame alignment circuit 95 asserts the BFRAME signal 97, which causes the transmit state machine 86 to assert the TxCLK 98 at time t6. The TxCLK 98 allows the CIF 77 to generate Word 00 of the second cell frame over the TxDATA 91.

At time t7, reconfiguration of the switching circuit 42 is complete, and the transmit state machine 86 causes transmission of the frame alignment pattern of four zeros followed by a one over the transmit data line 80. The frame alignment pattern indicates the start of a cell frame transmission.

At time t8, the transmit state machine 98 asserts the TxCLK 98 to sample the Word 00 of the second cell frame over the TxDATA 91. At time t9, the transmit state machine 98 causes serial transmission of the Word 00 of the second cell frame over the transmit data line 80.

Figure 13:
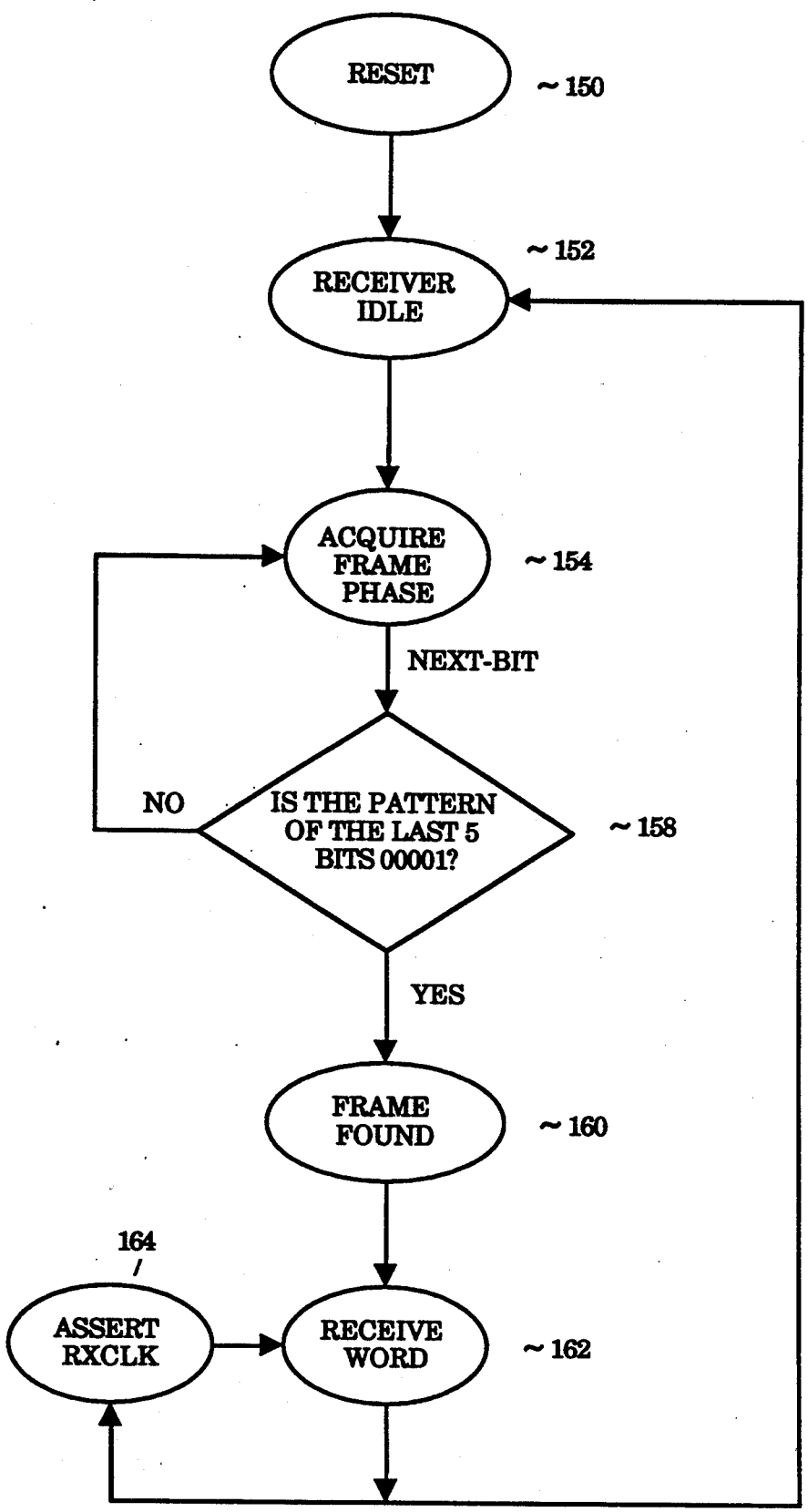
FIG. 13 is a flow diagram for the receive state machine of a serial interface unit.

FIG. 13 is a flow diagram for the receive state machine 85. The receive state machine 85 proceeds from a reset state 150 to a receiver idle state 152.

At the receiver idle state 152, the clock phase recovery circuit 93 samples the bit synchronization pattern over the receive data line 81 to determine an optimal sampling point. The bit synchronization pattern over the receive data line 81 may be from either the current configuration or from the previous configuration of the switching circuit 42. After the arbiter 41 asserts the FRAME signal 67, the frame alignment circuit 95 asserts the DFRAME signal 92. The DFRAME signal 92 causes the receive state machine 85 to proceeds to the acquire FRAME phase state 154.

At the acquire FRAME phase state 154, the switching circuit 42 has been reconfigured. The receive state machine 85 loops from the acquire FRAME phase state 154 through the decision state 158 while acquiring bits over the receive data line 81. At the decision state 158, the receive state machine 85 checks for the four zeros followed by a one bit pattern of the frame alignment pattern indicating the start of a cell frame. If the frame alignment pattern is found at the decision state 158, the receive state machine 85 proceeds to the FRAME found state 160.

Thereafter, the receive state machine 85 then proceeds to a loop comprising the receive word state 162 and the assert RxCLK state 164 to receive the cell frame over the receive data line 81, and to transfer each word of the cell frame to the CIF 77 over the RxDATA 90. At state 164, the receive state machine 85 asserts the RxCLK 96 to indicate valid data on the RxDATA 90. Thereafter, the receive state machine 85 proceeds to the receiver idle state 152 until the next FRAME.

Figure 14:
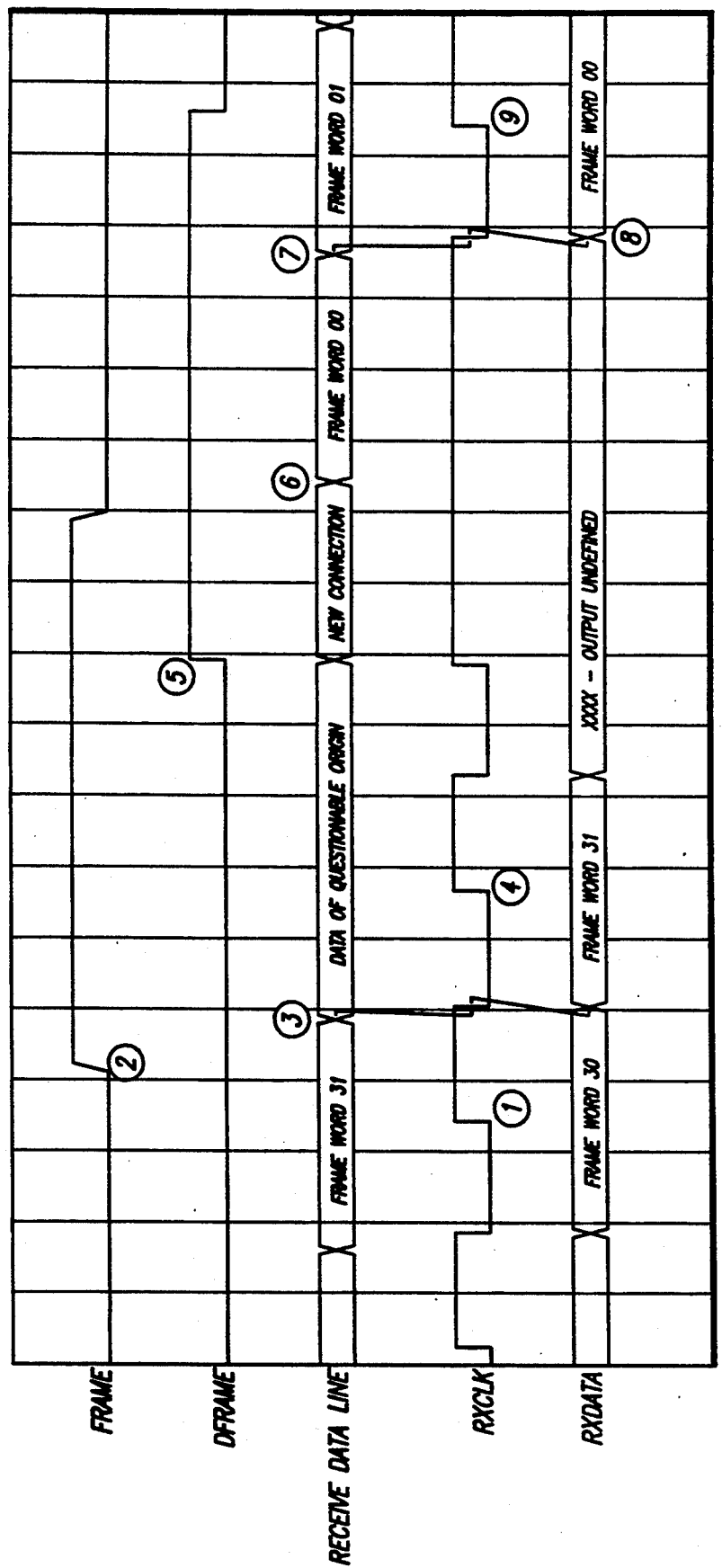
FIG. 14 is a timing diagram that illustrates the receive function of a serial interface unit during a FRAME transition between reception of a first cell frame and reception of a second cell frame over a receive data line.

FIG. 14 is a timing diagram that illustrates the receive function of the SIU 75 during a FRAME transition between reception of a first cell frame to reception of a second cell frame over the receive data line 81. The FRAME signal 67 is shown, along with the DFRAME signal 92, the RxCLK 96, the RxDATA 90, and the receive data line 81.

At time t1, the receive state machine 85 asserts the RxCLK 96 to indicate valid data for the Word 30 of the first cell frame on the RxDATA 90, while the Word 31 of the first cell frame are received over the receive data line 81.

At time t2, the arbiter 41 asserts the FRAME signal 67. After time t3, the data received over the receive data line 81 is of questionable origin due to switching circuit reconfiguration. The arbiter 41 reconfigures the switching circuit 42 while the bit synchronization pattern of alternating ones and zeros is received over the receive data line 81 from an unknown source.

At time t4, the receive state machine 85 asserts the RxCLK 96 to indicate valid data for the Word 31 of the first cell frame on the RxDATA 90, while the data of questionable origin is received over the receive data line 81.

At time t5, the reconfiguration of the switching circuit is complete, and the frame alignment circuit 95 asserts the DFRAME signal 92. The DFRAME signal 92 causes the receive state machine 85 to search for the frame alignment pattern over the received data line 81 to detect the start of the second cell frame. Between time t5 and t6, the bit synchronization pattern followed by the frame alignment pattern is received over the receive data line 81.

At time t6, the Word 00 of the second cell frame is received over the serial data line 81. At time t7, the Word 01 of the second cell frame is received over the serial data line 81. At time t8, the Word 00 of the second cell frame is transferred over the RxDATA 90. At time t9, the receive state machine 85 asserts the RxCLK 96 to indicate valid data on the RxDATA 90.

Figure 15:
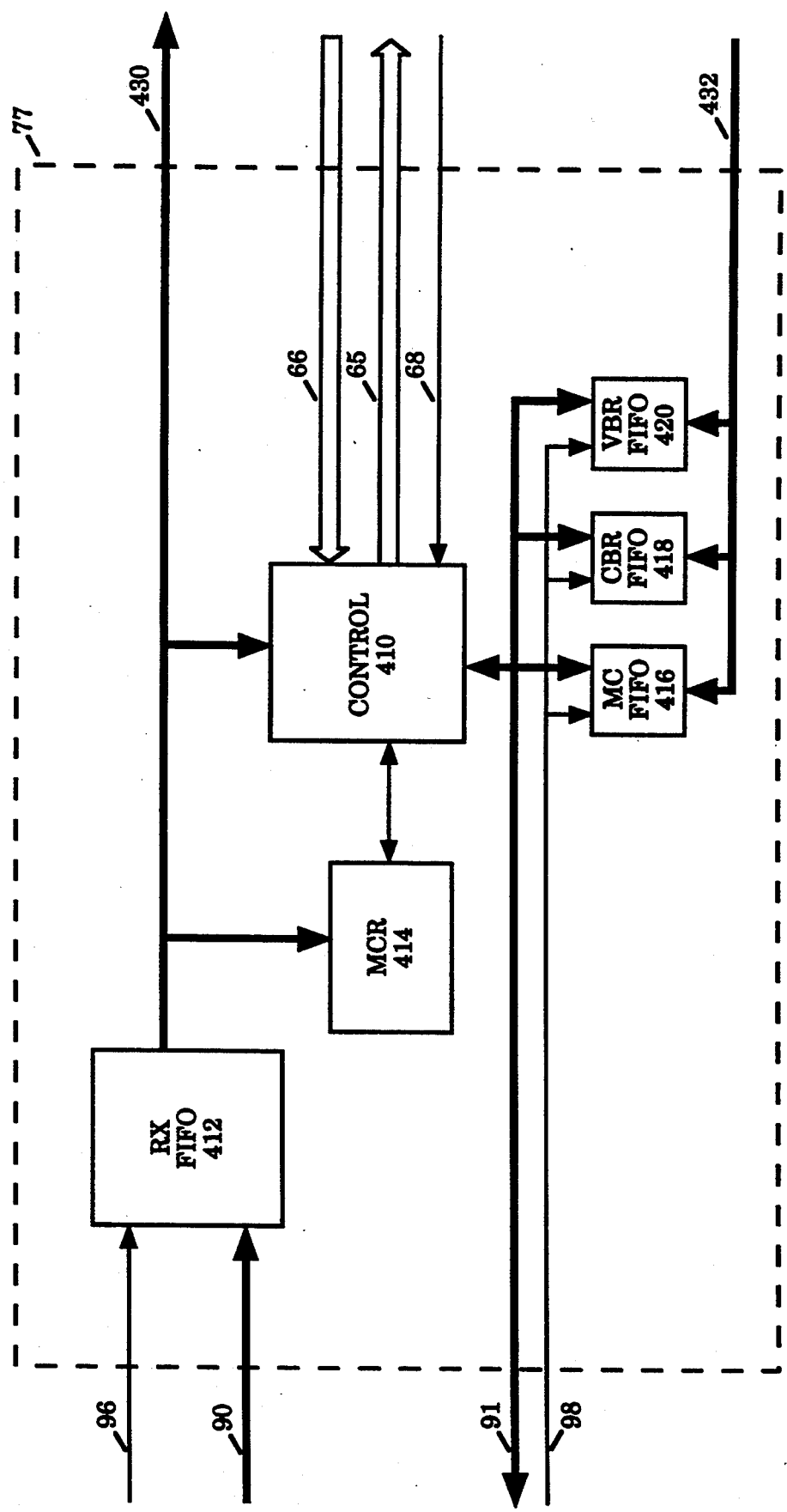
FIG. 15 is a block diagram of the CIF 77 which shows a receive first in first out memory (FIFO), a multicast RAM, a control circuit, and a set of transmit FIFOs.

FIG. 15 is a block diagram of the CIF 77. The CIF 77 comprises a receive first in first out memory (Rx FIFO) 412 for buffering outbound communication cells, a multicast RAM (MCR) 414, and a control circuit 410. The CIF 77 buffers inbound communication cells in a multicast (MC) FIFO 416, a constant bit rate (CBR) FIFO 418, and a variable bit rate (VBR) FIFO 420.

The Rx FIFO 412 receives cell frames from the SIU 75 over the RxDATA 90. The cell frames in the Rx FIFO 412 have the format of the cell frame 80. The control circuit 410 reads the type field for a cell frame in the Rx FIFO 412. If the type field specifies a single destination cell, the control circuit 410 verifies the primary destination address and the secondary destination address before transferring the payload for the cell frame to the LM 290 over a bus 430. If the primary destination address and the secondary destination address of the cell frame do not correspond to the CIF 77, the control circuit 410 discards the cell frame.

If the type field specifies a multicast cell, the control circuit 410 reads destination addresses for the cell frame from the MCR 414 to determine multicast destinations before transferring the payload of the cell frame to the LM 290 over the bus 430. If the type field specifies a null cell, the control circuit 410 discards the cell frame.

The MC FIFO 416, the CBR FIFO 418, and the VBR FIFO 420 receive inbound communication cells from the LM 290 over a bus 432. The MC FIFO 416 buffers multicast communication cells, the CBR FIFO 418 buffers communication cells received from constant bit rate sources, and the VBR FIFO 420 buffer communication cells received from variable bit rate sources. The control circuit 410 encapsulates the inbound communication cells into cell frames. The MC FIFO 416, the CBR FIFO 418, and the VBR FIFO 420 transfer the cell frames to the SIU 75 over the TxDATA 91.

The control circuit 410 processes polls from the arbiter 41 over the polling bus 66. The control circuit 410 reads the header fields of the cell frames in the MC FIFO 416, the CBR FIFO 418, and the VBR FIFO 420, and accordingly issues single-destination requests, multi-cast requests, an null requests over the response bus 65. The control circuit 410 causes transfer of an cell frame to the SILT 75 over the TxDATA 91 when the grant signal 68 is received from the arbiter 41.

The control circuit 410 transfers a null cell type cell frame to the SIU 75 if the arbiter 41 does not issue the grant signal 68 in response to a request from the control circuit 410 or if no request occurred. The SIU 75 transfers the null cell frame which may be sent through the last configured link from the SIU 75 transmitter through the switching circuit 42.

Figure 16:
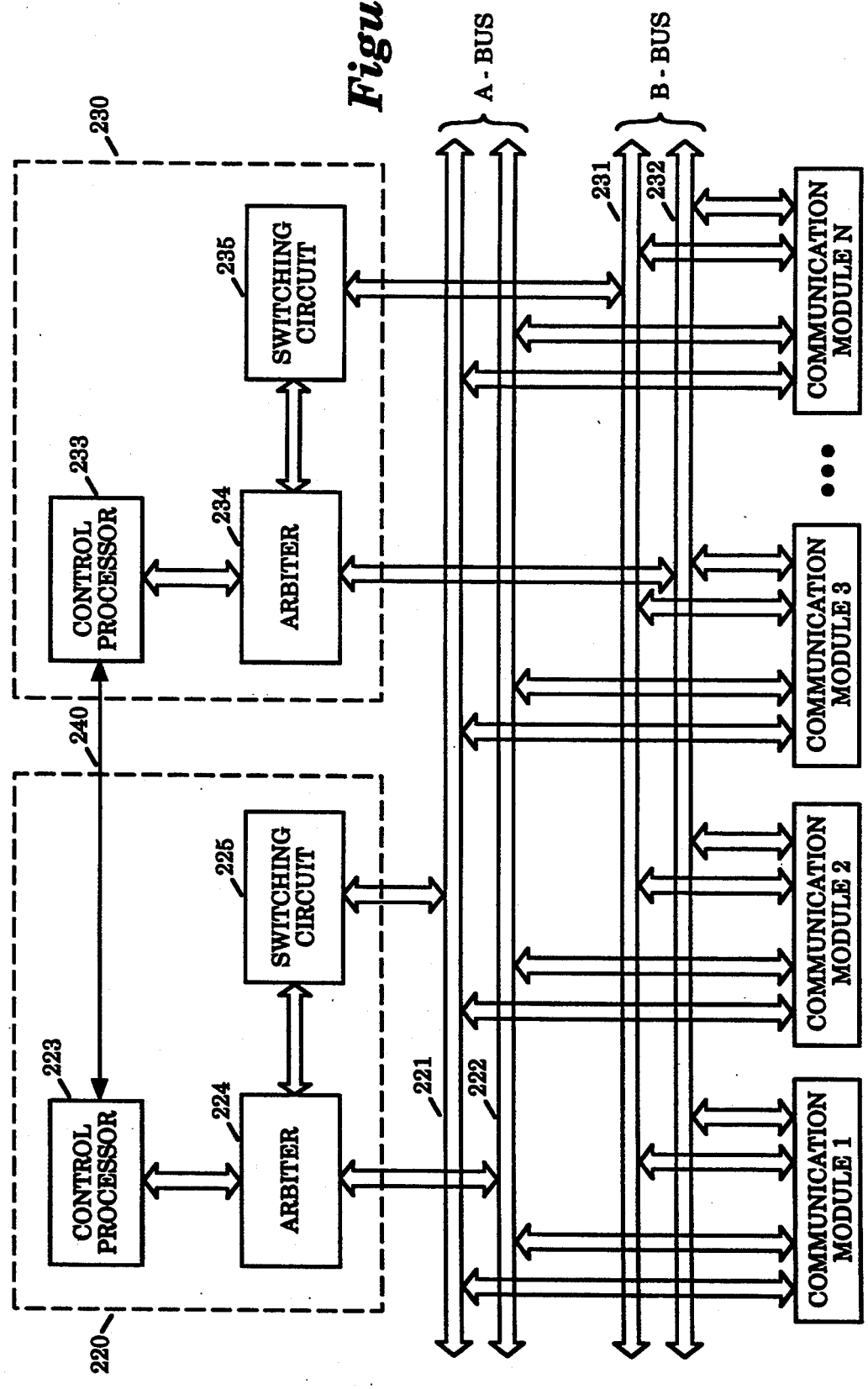
FIG. 16 is a block diagram of another broadband cell exchange unit comprising a set of communication modules, along with redundant sets of switching modules wherein each switching module comprises a control processor, an arbiter, and a switching circuit.

FIG. 16 is a block diagram of a BCX comprising a set of communication modules 1-N, and a redundant set of switching modules 220 and 230. The switching module 220 comprises a control processor 223, an arbiter 224, and a switching circuit 225. The switching module 230 comprises a control processor 233, an arbiter 234, and a switching circuit 235.

The communication modules 1-N enable high speed communication over a variety of communication links according to a cell switching communication protocol. The communication modules 1-N communicate over an A - BUS and a B - BUS. The A- BUS comprises a set of cell exchange lines 221 and an arbitration/control bus 222. The B - BUS comprises a set of cell exchange lines 231 and an arbitration/control bus 232.

The communication modules 1-N exchange communication cells over the A - BUS according to the communication protocol described above. The communication modules 1-N also exchange communication cells over the B - BUS according to the communication protocol described above. The SILTs of the communication modules 1-N perform serial communication over the cell exchange lines 221 through the switching circuit 225, and perform serial communication over the cell exchange lines 231 through the switching circuit 235. The CIFs of the communication modules 1-N process polls over the arbitration/control bus 222 from the arbiter 224, and process polls over the arbitration/control bus 232 from the arbiter 234.

The switching modules 220 and 230 function in a normal mode and a standby mode. The communication modules 1-N exchange communication cells over the A - BUS when the switching module 220 is in the normal mode and the switching module 230 is in a standby mode. The communication modules 1-N exchange communication cells over the B - BUS when the switching module 230 is in the normal mode and the switching module 220 is in a standby mode.

While the communication modules 1-N exchange communication cells over the A - BUS, the SIUs of the communication modules 1-N transfer test patterns over the cell exchange lines 231 of the B - BUS. Similarly, while the communication modules 1-N exchange communication cells over the B - BUS, the SIUs of the communication modules 1-N transfer pseudo random bit sequences over the cell exchange lines 221 of the A

- BUS. The test patterns verify the integrity of the cell exchange lines of the standby mode circuitry.

The phase recovery circuitry of the SIUs described above is also used to perform bit synchronization on the test patterns transferred over the standby cell exchange lines. An SIU performs bit synchronization on the test patterns after locking on to the frame alignment data pattern at the start of a cell frame.

The switching modules 220 and 230 coordinate transitions between the normal mode and the standby mode by exchanging control signals over a control bus 240. When a bus fault is detected on the A - BUS in normal mode, the control processor 223 sets the switching module 220 into the standby mode and signals the switching module 230 to transition from the standby mode to the normal mode. Similarly, when a bus fault is detected on the B - BUS in normal mode, the control processor 233 sets the switching module 230 into the standby mode and signals the switching module 220 to transition from the standby mode to the normal mode.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for exchanging communication cells, comprising the steps of:
   determining a first transmission request for each of a plurality of communication modules, each communication module having a transmit signal line and a receive signal line;
   selectively coupling the transmit signal lines to the receive signal lines according to the first transmission requests;
   transmitting at least one communication cell corresponding to the first transmission requests over the transmit signal lines, and receiving the communication cells corresponding of the first transmission requests over the receive signal lines, while determining a second transmission request for each communication module;
   selectively coupling the transmit signal lines to the receive signal lines according to the second transmission requests;
   transmitting at least one communication cell corresponding to the second transmission requests over the transmit signal lines, and receiving the communication cells corresponding to the second transmission requests over the receive signal lines, while determining a third transmission request for each communication module, wherein the step of determining a first transmission request for each of a plurality of communication modules comprises the steps of
   accessing a polling vector from a poll sequence table, the polling vector specifying a sequence of the communication modules;
   transmitting a poll to each communication module according to the polling vector;
   receiving the first transmission request from each communication module, such that the first transmission request specifies either a primary/secondary pair of destination communication modules or a null request.

2. The method of claim 1, wherein the step of transmitting at least one communication cell corresponding to the first transmission requests over the transmit signal lines comprises the steps of:
   for each communication module, transmitting the communication cell corresponding to the first transmission request over the transmit signal line if the first transmission request specifies the destination communication module and if the request is granted;
   for each communication module, transmitting a null FRAME pattern over the transmit signal line if the first transmission request specifies the null request.

3. The method of claim 2, wherein the step of transmitting the communication cell corresponding to the first transmission request over the transmit signal line comprises the steps of performing a parallel to serial conversion on the communication cell corresponding to the first transmission request and transmitting the communication cell over the transmit signal line.

4. The method of claim 3, wherein for each communication module, the step of receiving the communication cell corresponding to the first transmission request over the receive signal lines comprises the steps of receiving the corresponding communication cell over the receive data line and performing a parallel to serial conversion on the communication cell.

5. The method of claim 4, wherein the step of selectively coupling the transmit signal lines to the receive signal lines according to the first transmission requests comprises the step of configuring a switching circuit according to the first transmission requests, the switching circuit coupled to the transmit and receive data lines, such that the switching circuit provides full connectivity between the transmit and receive signal lines.

6. The method of claim 1, wherein the step of determining a second transmission request for each communication module comprises the steps of:
   accessing a polling vector from a poll sequence table, the polling vector specifying a sequence of the communication modules;
   transmitting a poll to each communication module according to the polling vector;
   receiving the second transmission request from each communication module, such that the second transmission request specifies either a primary/secondary pair of destination communication modules or a null request.

7. The method of claim 6, wherein the step of transmitting at least one communication cell corresponding to the second transmission requests over the transmit signal lines comprises the steps of:
   for each communication module, transmitting the communication cell corresponding to the second transmission request over the transmit signal line if the second transmission request specifies the destination communication module and the request was granted;
   for each communication module, transmitting a null FRAME pattern over the transmit signal line if the second transmission request specifies the null request.

8. The method of claim 7, wherein the step of transmitting the communication cell corresponding to the second transmission request over the transmit signal line comprises the steps of performing a parallel to serial conversion on the communication cell corresponding to the second transmission request and transmitting the communication cell over the transmit signal line.

9. The method of claim 8, wherein for each communication module, the step of receiving the communication cell corresponding to the second transmission request over the receive signal lines comprises the steps of receiving the corresponding communication cell over the receive data line and performing a parallel to serial conversion on the communication cell.

10. The method of claim 9, wherein the step of selectively coupling the transmit signal lines to the receive signal lines according to the second transmission requests comprises the step of configuring a switching circuit according to the second transmission requests, the switching circuit coupled to the transmit and receive data lines, such that the switching circuit provides full connectivity between the transmit and receive signal lines.

11. The method of claim 1, wherein the step of determining a third transmission request for each communication module comprises the steps of:
  accessing a polling vector from a poll sequence table, the polling vector specifying a sequence of the communication modules;
  transmitting a poll to each communication module according to the polling vector;
  receiving the third transmission request from each communication module, such that the third transmission request specifies either a primary/secondary pair of destination communication modules or a null request.

12. An apparatus for exchanging communication cells, comprising:
  means for determining a first transmission request for each of a plurality of communication modules, each communication module having a transmit signal line and a receive signal line;
  means for selectively coupling the transmit signal lines to the receive signal lines according to the first transmission requests;
  means for transmitting at least one communication cell corresponding to the first transmission requests over the transmit signal lines, and receiving the communication cells corresponding of the first transmission requests over the receive signal lines, while determining a second transmission request for each communication module;
  means for selectively coupling the transmit signal lines to the receive signal lines according to the second transmission requests;
  means for transmitting at least one communication cell corresponding to the second transmission requests over the transmit signal lines, and receiving the communication cells corresponding to the second transmission requests over the receive signal lines, while determining a third transmission request for each communication module, wherein the step of determining a first transmission request for each of a plurality of communication modules comprises
  means for accessing a polling vector from a poll sequence table, the polling vector specifying a sequence of the communication modules;
  means for transmitting a poll to each communication module according to the polling vector;
  means for receiving the first transmission request from each communication module, such that the first transmission request specifies either a primary/secondary pair of destination communication modules or a null request.

13. The apparatus of claim 12, wherein the means for transmitting at least one communication cell corresponding to the first transmission requests over the transmit signal lines comprises:
  for each communication module, means for transmitting the communication cell corresponding to the first transmission request over the transmit signal line if the first transmission request specifies the destination communication module;
  for each communication module, means for transmitting a null FRAME pattern over the transmit signal line if the first transmission request specifies the null request.

14. The apparatus of claim 13, wherein the means for transmitting the communication cell corresponding to the first transmission request over the transmit signal line comprises means for performing a parallel to serial conversion on the communication cell corresponding to the first transmission request and means for transmitting the communication cell over the transmit signal line.

15. The apparatus of claim 14, wherein for each communication module, the means for receiving the communication cells corresponding to the first transmission requests over the receive signal lines comprises means for receiving the corresponding communication cell over the receive data line and means for performing a parallel to serial conversion on the communication cell.

16. The apparatus of claim 15, wherein the means for selectively coupling the transmit signal lines to the receive signal lines according to the first transmission requests comprises means for configuring a switching circuit according to the first transmission requests, the switching circuit coupled to the transmit and receive data lines, such that the switching circuit provides full connectivity between the transmit and receive signal lines.

17. The apparatus of claim 12, wherein the means for determining a second transmission request for each communication module comprises:
  means for accessing a polling vector from a poll sequence table, the polling vector specifying a sequence of the communication modules;
  means for transmitting a poll to each communication module according to the polling vector;
  means for receiving the second transmission request from each communication module, such that the second transmission request specifies either a primary/secondary pair of destination communication modules or a null request.

18. The apparatus of claim 17, wherein the means for transmitting at least one communication cell corresponding to the second transmission requests over the transmit signal lines comprises:
  for each communication module, means for transmitting the communication cell corresponding to the second transmission request over the transmit signal line if the second transmission request specifies the destination communication module;
  for each communication module, means for transmitting a null FRAME pattern over the transmit signal line if the second transmission request specifies the null request.

19. The apparatus of claim 18, wherein the means for transmitting the communication cell corresponding to the second transmission request over the transmit signal line comprises means for performing a parallel to serial conversion on the communication cell corresponding to the second transmission request and means for transmitting the communication cell over the transmit signal line.

20. The apparatus of claim 19, wherein for each communication module, the means for receiving the communication cells corresponding to the second transmission requests over the receive signal lines comprises means for receiving the corresponding communication cell over the receive data line and means for performing a parallel to serial conversion on the communication cell.

21. The apparatus of claim 20, wherein the means for selectively coupling the transmit signal lines to the receive signal lines according to the second transmission requests comprises means for configuring a switching circuit according to the second transmission requests, the switching circuit coupled to the transmit and receive data lines, such that the switching circuit provides full connectivity between the transmit and receive signal lines.

22. The apparatus of claim 12, wherein the means for determining a third transmission request for each communication module comprises:
  means for accessing a polling vector from a poll sequence table, the polling vector specifying a sequence of the communication modules;
  means for transmitting a poll to each communication module according to the polling vector;
  means for receiving the third transmission request from each communication module, such that the third transmission request specifies either a primary/secondary pair of destination communication modules or a null request.

23. A communication cell exchange unit, comprising:
  a plurality of communication modules each coupled to a plurality of transmit data lines and receive data lines, each communication module having a receiver circuit coupled to receive a cell frame data stream over one of the receive data lines, the receiver circuit performing clock recovery on the cell frame data stream, each communication module further comprising a transmitter circuit that generates the cell frame data stream by combining a set of cell frame data with a bit synchronization pattern, the transmitter circuit coupled to transmit the cell frame data stream over one of the transmit data lines wherein the receiver circuit performs clock recovery on the cell frame data stream by synchronizing a receive clock to the bit synchronization pattern of the cell frame data stream, each communication module further comprising a receive register coupled to receive the cell frame data stream and the receive clock, such that the receive clock causes the receive register to sample the cell frame data of the cell frame data stream;
  switching circuit coupled to the transmit data lines and receive data lines, the switching circuit selectively coupling the transmit data lines to the receive data lines according to a set of configuration data.

24. The communication cell exchange unit of claim 23, further comprising an arbiter circuit having circuitry for generating the configuration data by determining a set of transmission requests for the communication modules, the arbiter circuit coupled to transfer the configuration data to the switching circuit.

25. The communication cell exchange unit of claim 24, wherein the arbiter circuit determines the transmission requests by polling the communication modules over an arbitration/control bus.

26. The communication cell exchange unit of claim 25, wherein each communication module further comprises a communication interface circuit coupled to receive a communication cell from a cell switching communication network, the communication interface circuit assembling the communication cell into the cell frame data such that the cell frame data specifies at least one destination from among the communication modules.

27. The communication cell exchange unit of claim 26, wherein the communication interface circuit receives a poll from the arbiter circuit over the arbitration/control bus, and transfers a request to the arbiter circuit over the arbitration/control bus, such that the request specifies the destination of the cell frame data.

28. The communication cell exchange unit of claim 27, wherein the arbiter circuit transfers the configuration data to the switching circuit according to the request, the arbiter circuit then issuing a frame signal to the transmitter circuit, the frame signal causing the transmitter circuit to access the cell frame data from the communication interface circuit and transmit the cell frame data stream.

29. The communication cell exchange unit of claim 28, wherein the communication interface circuit comprises a constant bit rate first-in first-out (FIFO) memory, a variable bit rate FIFO memory, and a multicast FIFO memory for buffering the communication cell.

30. The communication cell exchange unit of claim 29, wherein the communication interface circuit buffers the communication cell in the constant bit rate FIFO memory if the communication cell is received from a constant bit rate source on the cell switching communication network.

31. The communication cell exchange unit of claim 29, wherein the communication interface circuit buffers the communication cell in a variable bit rate FIFO memory if the communication cell is received from a variable bit rate source on the cell switching communication network.

32. The communication cell exchange unit of claim 29, wherein the communication interface circuit buffers the communication cell in a multicast FIFO memory if the communication cell corresponds to multiple destinations on the cell switching communication network.

33. The communication cell exchange unit of claim 29 wherein each communication module further comprises a communication interface circuit coupled to receive the cell frame data from the receive register, the communication interface circuit extracting a communication cell from the cell frame data.

34. The communication cell exchange unit of claim 23, wherein each communication module further comprises circuitry for transmitting the communication cell over a cell switching communication network.

35. The communication cell exchange unit of claim 25, further comprising a redundant switching circuit coupled to a set of redundant transmit and receive data lines, the redundant switching circuit selectively coupling the redundant transmit data lines to the redundant receive data lines according to a set of redundant configuration data.

36. The communication cell exchange unit of claim 35, further comprising a redundant arbiter circuit that generates the redundant configuration data by polling the communication modules over a redundant arbitration/control bus, the redundant arbiter circuit coupled to transfer the redundant configuration data to the redundant switching circuit.

37. The communication cell exchange unit of claim 36, wherein each communication module is coupled to transmit a test pattern over one of the redundant transmit data lines and to receive the test pattern over one of the redundant receive data lines.

* * * * *